(12) United States Patent
Huang et al.

(10) Patent No.: US 11,296,755 B2
(45) Date of Patent: Apr. 5, 2022

(54) COMMUNICATION METHOD AND COMMUNICATIONS APPARATUS

(71) Applicant: HUAWEI TECHNOLOGIES CO., LTD., Guangdong (CN)

(72) Inventors: Yi Huang, Shenzhen (CN); Huangping Jin, Shanghai (CN); Huiying Zhu, Shanghai (CN); Yuanjie Li, Shanghai (CN); Xiaoyan Bi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/033,167

(22) Filed: Sep. 25, 2020

(65) Prior Publication Data

US 2021/0013937 A1 Jan. 14, 2021

Related U.S. Application Data

(63) Continuation of application No. PCT/CN2019/081683, filed on Apr. 8, 2019.

(30) Foreign Application Priority Data

Apr. 8, 2018 (CN) .......................... 201810307588.3

(51) Int. Cl.
*H04B 7/04* (2017.01)
*H04B 7/0456* (2017.01)

(52) U.S. Cl.
CPC .................................. *H04B 7/0456* (2013.01)

(58) Field of Classification Search
CPC .......... H04B 7/02; H04B 7/04; H04B 7/0408; H04B 7/0413; H04B 7/0417;

(Continued)

(56) References Cited

U.S. PATENT DOCUMENTS

2016/0119097 A1* 4/2016 Nam ...................... H04L 5/0023
370/329
2016/0142117 A1* 5/2016 Rahman ............... H04B 7/0469
375/267

(Continued)

FOREIGN PATENT DOCUMENTS

CN 105210307 A 12/2015
CN 106233640 A 12/2016

(Continued)

OTHER PUBLICATIONS

Ericsson, Codebook design for Type II CSI feedback. 3GPP TSG-RAN WG1 #89, Hangzhou, China, May 15-19, 2017, R1-1708688, 10 pages.

(Continued)

*Primary Examiner* — Siu M Lee
(74) *Attorney, Agent, or Firm* — Womble Bond Dickinson (US) LLP

(57) ABSTRACT

This application provides a communication method and a communications apparatus. The method includes: generating, by a terminal device, first indication information, where the first indication information is used to indicate a precoding matrix, the precoding matrix is applied to at least one antenna panel and includes at least one precoding vector, each precoding vector includes a plurality of subvectors, each subvector corresponds to an antenna port on the antenna panel and includes two polarization vectors, and each polarization vector is generated by performing weighted combination on a plurality of basis vectors; and sending the first indication information. In embodiments of this application, accuracy of a codebook can be improved.

20 Claims, 6 Drawing Sheets

(58) Field of Classification Search
CPC .. H04B 7/0421; H04B 7/0456; H04B 7/0469; H04B 7/0478; H04B 7/0482; H04B 7/0486; H04B 7/0619; H04B 7/0621; H04B 7/0626; H04B 7/0632; H04B 7/0634; H04B 7/0636; H04B 7/0639; H04B 7/0663; H04B 7/0673; H04B 7/12; H04L 5/0057
See application file for complete search history.

(56) References Cited

U.S. PATENT DOCUMENTS

| | | | |
|---|---|---|---|
| 2016/0204843 | A1 | 7/2016 | Chen et al. |
| 2016/0211895 | A1* | 7/2016 | Onggosanusi .... H04L 25/03955 |
| 2017/0279514 | A1 | 9/2017 | Rahman et al. |
| 2017/0302353 | A1* | 10/2017 | Rahman ............... H04B 7/0478 |

FOREIGN PATENT DOCUMENTS

| | | | |
|---|---|---|---|
| CN | 106612137 A | 5/2017 | |
| CN | 107370558 A | 11/2017 | |
| CN | 107690756 A | 2/2018 | |
| CN | 107707341 A | 2/2018 | |
| CN | 107888246 A | 4/2018 | |

OTHER PUBLICATIONS

Intel Corporation, Further discussion on NR Type I codebook design. 3GPP TSG-RAN WG1 NR Ad-Hoc meeting, Spokane, USA Jan. 16-20, 2017, R1-1700341, 9 pages.
3GPP TS 38.214 V15.0.0 (Dec. 2017), 3rd Generation Partnership Project;Technical Specification Group Radio Access Network;NR;Physical layer procedures for data (Release 15), 71 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2019/081683, filed on Apr. 8, 2019, which claims priority to Chinese Patent Application No. 201810307588.3, filed on Apr. 8, 2018. The disclosures of the aforementioned applications are hereby incorporated by reference in their entireties.

TECHNICAL FIELD

This application relates to the communications field, and in particular, to a communication method and a communications apparatus.

BACKGROUND

As one key technology of new radio access technologies (NR), a massive multiple-input multiple-output (MIMO) technology has been widely researched, to improve a system capacity by using more spatial degree of freedom.

In a massive MIMO system, a transmit end (for example, a network device) may send data to a receive end (for example, a terminal device) by using an antenna array including a plurality of transmit antennas, thereby improving a system throughput. To improve system transmission performance by performing precoding at the transmit end, the transmit end needs to learn of channel state information (CSI), and the CSI is usually obtained by the receive end through channel measurement. Therefore, the receive end needs to feed back the CSI to the transmit end. The transmit end and the receive end share a codebook, and the codebook includes a set of at least one precoding matrix. The receive end feeds back the CSI to the transmit end mainly by feeding back a precoding matrix indicator (PMI) to the transmit end. After obtaining the CSI through channel estimation, the receive end selects a precoding matrix from the codebook based on the CSI, and feeds back a PMI corresponding to the precoding matrix to the network device. The network device recovers an optimal precoding matrix based on the PMI, and then performs precoding processing. For related content, refer to the prior art.

In the NR, two types of codebooks: a type I (type I) single-panel codebook and a type II (type II) single-panel codebook, are designed for the antenna array. The type I (type I) single-panel codebook is a low-precision codebook with relatively low overheads. A structure of each column vector in a precoding matrix in the codebook is a Kronecker product of two discrete fourier transform (DFT) vectors $v_l$ and $u_m$, that is, $$v_l \otimes u_m.$$

Accuracy of representing a channel characteristic by using the type I codebook is relatively low. However, the type I codebook has relatively low feedback overheads, and is applicable to a user with a relatively low signal processing capability.

The type II (type II) single-panel codebook is a high-precision codebook with relatively high overheads. A structure of a precoding vector (namely, a column vector of W) in a precoding matrix W in the codebook is obtained by performing linear weighted combination on orthogonal bases formed by using a Kronecker product of DFT vectors $v_{l_1}$ and $u_{m_1}$ a Kronecker product of DFT vectors $v_{l_2}$ and $u_{m_2}$, that is, $$W = a_1 v_{l_1} \otimes u_{m_1} + a_2 v_{l_2} \otimes u_{m_2}, \text{ where}$$

$v_{l_1}$ may be equal to $v_{l_2}$, or may not be equal to $v_{l_2}$, $u_{m_1}$ may be equal to $u_{m_2}$, or may not be equal to $u_{m_2}$, and $a_1$ and $a_2$ represent amplitude and/or phase weights. It needs to be understood that, in the foregoing precoding matrix, only two orthogonal bases are combined. During actual application, a plurality of orthogonal bases may be combined. For related content, refer to the prior art. It can be learned from the foregoing structure that, in the type II codebook, the precoding vector is obtained by performing linear weighted combination of a plurality of DFT vectors, so that a channel characteristic in a non-line-of-sight (NLoS) case can be represented more accurately. However, compared with the type I codebook, the type II codebook has relatively high feedback overheads, and is applicable to a user with a relatively high signal processing capability.

In an existing standard, a multi-panel codebook is defined based on the type codebook. Consequently, accuracy is not high.

SUMMARY

This application provides a communication method and a communications apparatus, to improve accuracy of a codebook.

According to a first aspect, a communication method is provided. The method includes:

generating, by a terminal device, first indication information, where the first indication information is used to indicate a precoding matrix, the precoding matrix is applied to at least one antenna panel and includes at least one precoding vector, each precoding vector includes at least one subvector, each subvector corresponds to an antenna port on the antenna panel and includes two polarization vectors, and each polarization vector is generated by performing weighted combination on a plurality of basis vectors; and sending the first indication information.

Therefore, in this embodiment of this application, at least one subvector is set in the precoding matrix, so that the precoding matrix includes a subvector corresponding to an antenna port on each antenna panel of a network device. In addition, in this embodiment of this application, a signal that is sent by the network device through at least one panel can be precoded in a relatively accurate manner by using the precoding matrix. Therefore, accuracy of a codebook can be improved in this embodiment of this application.

According to a second aspect, a communication method is provided. The method includes:

receiving first indication information, where the first indication information is used to indicate a precoding matrix, the precoding matrix is applied to at least one antenna panel and includes at least one precoding vector, each precoding vector includes at least one subvector, each subvector corresponds to an antenna port on the antenna panel and includes two polarization vectors, and each polarization vector is generated by performing weighted combination on a plurality of basis vectors; and determining the precoding matrix based on the first indication information.

Therefore, in this embodiment of this application, at least one subvector is set in the precoding matrix, so that the precoding matrix includes a subvector corresponding to an antenna port on each antenna panel of a network device. In addition, in this embodiment of this application, a signal that is sent by the network device through at least one panel can be precoded in a relatively accurate manner by using the precoding matrix. Therefore, accuracy of a codebook can be improved in this embodiment of this application.

It needs to be understood that the method on a network device side described in the second aspect corresponds to the method for the terminal device described in the first aspect. For the method on the network device side, refer to description of a terminal device side. To avoid repetition, detailed descriptions are properly omitted herein.

It needs to be understood that, in this application, a quantity of precoding vectors in the precoding matrix (namely, a quantity of columns of the precoding matrix) corresponds to a quantity of data layers. For example, when an RI is equal to 1, the precoding matrix includes one precoding vector; when the RI is equal to 2, the precoding matrix includes two precoding vectors; and so on.

In this embodiment of this application, the network device has a plurality of panels, and each precoding vector has a plurality of subvectors that are in a one-to-one correspondence with the plurality of panels. For example, when the network device has two panels, each precoding vector has two subvectors; when the network device has four panels, each precoding vector has four subvectors; and so on.

Each subvector includes two polarization vectors. For example, the two polarization vectors include a first polarization vector and a second polarization vector that respectively correspond to two polarization directions of a dual polarization antenna.

With reference to the first aspect or the second aspect, in an embodiment,
the precoding matrix is:

$$\frac{1}{\alpha}[P_1 \quad P_2 \quad \ldots \quad P_r],$$

where
$P_l$ is the precoding vector, $r \geq l \geq 1$, $r \geq 1$, $r$ represents the quantity of data layers, $$\frac{1}{\alpha}$$

is a normalized coefficient, and $$0 < \frac{1}{\alpha} \leq 1;$$

the precoding vector $P_l$ is:

$$\begin{bmatrix} S_1^l \\ S_2^l \\ \vdots \\ S_{N_g}^l \end{bmatrix},$$

where
$S_i^l$ is a subvector of the precoding vector $P_l$, $N_g \geq i \geq 1$, $N_g \geq 1$, and $N_g$ is a quantity of the at least one antenna panel; and the subvector $S_i^l$ is:

$$\begin{bmatrix} Q_{1,i}^l \\ Q_{2,i}^l \end{bmatrix},$$

where
$Q_{x,i}^l$ is a polarization vector of the subvector $S_i^l$, and x is equal to 1 or 2.

Therefore, in this embodiment of this application, at least one subvector is set in the precoding matrix, so that the precoding matrix includes a subvector corresponding to an antenna port on each antenna panel of a network device. In addition, in this embodiment of this application, a signal that is sent by the network device through at least one panel can be precoded in a relatively accurate manner by using the precoding matrix. Therefore, accuracy of a codebook can be improved in this embodiment of this application.

The following describes in detail, with reference to examples, a form of the precoding matrix in this embodiment of this application and a form of information indicated by the first indication information indicating the precoding matrix.

It needs to be understood that, in this specification, the information indicated by the first indication information is referred to as to-be-indicated information. In one embodiment, the to-be-indicated information is indicated in a plurality of manners. The to-be-indicated information may be, for example, but not limited to, directly indicated. For example, the to-be-indicated information or an index of the to-be-indicated information is directly indicated. Alternatively, the to-be-indicated information may be indirectly indicated by indicating other information, where there is an association relationship between the other information and the to-be-indicated information. Alternatively, only a part of the to-be-indicated information may be indicated, and another part of the to-be-indicated information is known or pre-agreed. For example, information may be indicated by using a pre-agreed (for example, protocol-specified) arrangement order of various pieces of information, thereby reducing indication overheads to some extent. In addition, common parts of the various pieces of information may be further identified and uniformly indicated, to reduce indication overheads caused by separate indication of same information.

In one embodiment, for indications of various parameters, for example, but not limited to, $B_m$, $\varphi_m$, $a_{m,1,i}^l$, $p_{m,1,i}^l$, and $c_i^l$, refer to, for example, but not limited to, indications of similar parameters in a new radio (NR) standard, for example, refer to indications of similar parameters in a type II (type II) codebook in the NR standard. Certainly, another indication manner may also be used. In addition, with reference to a similar manner in the NR standard, one or more of the parameters such as $\varphi_m$, $a_{m,1,i}^l$, $p_{m,1,i}^l$, and $c_i^l$ may alternatively be indicated in a normalization manner, to normalize another parameter of a same type based on a reference parameter. In this case, in an indication process, a normalization result of the another parameter of the same type is indicated. A particular value of the reference parameter does not need to be indicated, but a default value, for example, a preset constant (for example, 1), of the reference parameter is specified in the standard. Although the particular value of the reference parameter does not need to be indicated, other information associated with the reference parameter may need to be indicated. Certainly, the other information may alternatively not need to be indicated. It can be learned that a plurality of parameter values of the parameter of the same type may be indicated by using different methods. In addition, the foregoing normalization operation may be performed for all antenna panels, or may be performed for each antenna panel. A indication manner is not limited in this embodiment of this application. In conclusion, in a process of indicating each parameter, not all parameter values of the parameter of the same type need to be indicated. Therefore, the indication of the foregoing parameters needs to be understood as indication of some or all of the foregoing parameters.

In this embodiment of this application, the to-be-indicated information may be sent as a whole, or may be divided into a plurality of pieces of sub-information and sent separately. In addition, sending periodicities and/or sending occasions of these pieces of sub-information may be the same or may be different. A sending method is not limited in this application. The sending periodicities and/or sending occasions of these pieces of sub-information may be predefined, for example, predefined in a protocol, or may be configured by a transmit end device by sending configuration information to a receive end device. The configuration information may include, for example, but not limited to, one or a combination of at least two of downlink control information (DCI) and higher layer signaling such as radio resource control (RRC) signaling/medium access control (MAC) layer signaling.

In this embodiment of this application, the first indication information may be a precoding vector indicator (PMI), or may be other indication information. The first indication information may be carried in one or more messages in the prior art and sent by the receive end device to the transmit end device, or may be carried in one or more messages newly designed in this application and sent by the receive end device to the transmit end device.

With reference to the first aspect or the second aspect, in an embodiment, $$Q_{x,i}^l = \sum_{m=1}^{L} A_{m,x,i}^l B_m,$$

where $B_m$ is the basis vector, $L \geq m > 1$, $L \geq 2$, and $A_{m,x,i}^l$ is a weight of the basis vector $B_m$.

It can be learned from the foregoing formula that, in this embodiment of this application, an $m^{th}$ basis vector $B_m$, that is included in the first polarization vector is the same as an $m^{th}$ basis vector $B_m$, that is included in the second polarization vector. In other words, two groups of basis vectors (where each group of basis vectors includes L basis vectors) that are respectively included in two polarization vectors are the same. A difference between the two polarization vectors is that a same basis vector in each polarization direction has a respective weight $A_{m,x,i}^l$.

With reference to the first aspect or the second aspect, in an embodiment, $B_m$ is a Kronecker product of two vectors, a dimension of one vector is $N_1$, a dimension of the other vector is $N_2$, a dimension of $B_m$ is $N_1 N_2$, and each antenna panel has $N_1$ antenna port pairs in a first dimension and $N_2$ antenna port pairs in a second dimension.

It needs to be understood that, in this embodiment of this application, the antenna port (or briefly referred to as a port) may be understood as a reference signal port, and one reference signal corresponds to one antenna port. For example, the reference signal may include a channel state information reference signal (CSI-RS), a DMRS, and an SRS. Different types of reference signals are used to implement different functions. The antenna port in this application may be a CSI-RS port, a DMRS port, or an SRS port. For example, during downlink transmission, when the reference signal that is sent by the network device and that is used for the channel measurement is the CSI-RS, the antenna port may be referred to as the CSI-RS port. This embodiment of this application is not limited thereto.

It needs to be understood that, in this embodiment of this application, the "antenna port pair" may represent two antenna ports in different polarization directions.

With reference to the first aspect or the second aspect, in an embodiment, $$A_{m,x,i}^l = a_{m,x,i}^l p_{m,x,i}^l, \text{ wherein}$$

$a_{m,x,i}^l$ represents an amplitude coefficient, and $p_{m,x,i}^l$ represents a phase coefficient.

With reference to the first aspect or the second aspect, in an embodiment, $$A_{m,2,i}^l = \varphi_m A_{m,1,i}^l, \text{ wherein}$$

$\varphi_m$ represents a polarization phase factor, and the first indication information is used to indicate $B_m$, $\varphi_m$, $a_{m,x,i}^l$, and $p_{m,x,i}^l$.

Because a weight of the basis vector corresponding to the second polarization vector is a product of a weight of the same basis vector corresponding to the first polarization vector and $\varphi_m$, in this embodiment of this application, a weight parameter of the precoding matrix may be simplified. In this embodiment of this application, each subvector may be indicated by indicating weights of a group of basis vectors and the polarization phase factor instead of indicating weights of the two groups of basis vectors of the two polarization vectors. Therefore, in this embodiment of this application, the size of indication information of the precoding matrix can be reduced, and system performance can be improved.

With reference to the first aspect or the second aspect, in an embodiment, $$A_{m,x,i}^l = c_i^l a_{m,x,i}^l p_{m,x,i}^l, \text{ wherein}$$

$a_{m,x,i}^l$ represents an amplitude coefficient, $p_{m,x,i}^l$ represents a phase coefficient, and $c_i^l$ represents an antenna panel phase factor.

With reference to the first aspect or the second aspect, in an embodiment, $c_1^l = 1$, and the first indication information is used to indicate $B_m$, $c_i^l (i \neq 1)$, $a_{m,x,i}^l$, and $p_{m,x,i}^l$.

In other words, in this embodiment of this application, a phase factor of another antenna panel may be normalized based on the antenna panel phase factor $c_1^l$ corresponding to a first antenna panel. Therefore, in this embodiment of this application, the phase factor of the first antenna panel may not be reported. Therefore, in this embodiment of this application, a weight parameter of the precoding matrix may be simplified, so that the size of indication information of the precoding matrix can be reduced, and system performance can be improved.

With reference to the first aspect or the second aspect, in an embodiment, $c_i^l$ is equal to 0 or 1, and the first indication information is used to indicate $B_m$, $c_i^l$, $a_{m,x,i}^l$, and $p_{m,x,i}^l$.

According to a third aspect, a communications apparatus is provided, including each module or unit configured to perform the method in any one of the first aspect or the possible embodiments of the first aspect.

In one embodiment, the communications apparatus is a terminal device.

According to a fourth aspect, a communications apparatus is provided, including each module or unit configured to perform the method in any one of the second aspect or the possible embodiments of the second aspect.

In one embodiment, the communications apparatus is a network device.

According to a fifth aspect, a communications apparatus is provided, including a transceiver, a processor, and a memory. The processor is configured to control the transceiver to transmit and receive signals. The memory is configured to store a computer program. The processor is configured to invoke the computer program from the memory and run the computer program, so that the communications apparatus performs the method in the first aspect and the possible embodiments of the first aspect.

In one embodiment, the communications apparatus is a terminal device.

According to a sixth aspect, a communications apparatus is provided, including a transceiver, a processor, and a memory. The processor is configured to control the transceiver to transmit and receive signals. The memory is configured to store a computer program. The processor is configured to invoke the computer program from the memory and run the computer program, so that the communications apparatus performs the method in the second aspect and the possible embodiments of the second aspect.

In one embodiment, the communications apparatus is a network device.

According to a seventh aspect, a computer-readable medium is provided. The computer-readable medium stores a computer program. When the computer program is executed by a computer, the method in any one of the first aspect or the possible embodiments of the first aspect is implemented.

According to an eighth aspect, a computer-readable medium is provided. The computer-readable medium stores a computer program. When the computer program is executed by a computer, the method in any one of the second aspect or the possible embodiments of the second aspect is implemented.

According to a ninth aspect, a computer program product is provided. When the computer program product is executed by a computer, the method in any one of the first aspect or the possible embodiments of the first aspect is implemented.

According to a tenth aspect, a computer program product is provided. When the computer program product is executed by a computer, the method in any one of the second aspect or the possible embodiments of the second aspect is implemented.

According to an eleventh aspect, a processing apparatus is provided, including a processor and an interface.

The processor is configured to perform the method in any one of the first aspect, the second aspect, the possible embodiments of the first aspect, or the possible embodiments of the second aspect. A related data exchange process (for example, performing or receiving data transmission) is completed by using the interface. In one embodiment, the interface may further complete the foregoing data exchange process through a transceiver.

It needs to be understood that the processing apparatus in the eleventh aspect may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in a memory. The memory may be integrated into the processor, or may be located outside the processor and exist independently.

According to a twelfth aspect, a communications apparatus is provided, including a processor and a memory. The memory is configured to store a computer program. The processor is configured to invoke the computer program from the memory and run the computer program, so that the communications apparatus performs the method in the first aspect and the possible embodiments of the first aspect.

According to a thirteenth aspect, a communications apparatus is provided, including a processor and a memory. The memory is configured to store a computer program. The processor is configured to invoke the computer program from the memory and run the computer program, so that the communications apparatus performs the method in the second aspect and the possible embodiments of the second aspect.

According to a fourteenth aspect, a communications system is provided, including the foregoing network device and terminal device.

BRIEF DESCRIPTION OF DRAWINGS

FIG. 3 is a schematic structural diagram of an antenna panel according to an embodiment of this application;

FIG. 4 is a schematic structural diagram of an antenna panel according to another embodiment of this application;

DESCRIPTION OF EMBODIMENTS

Figure 1:
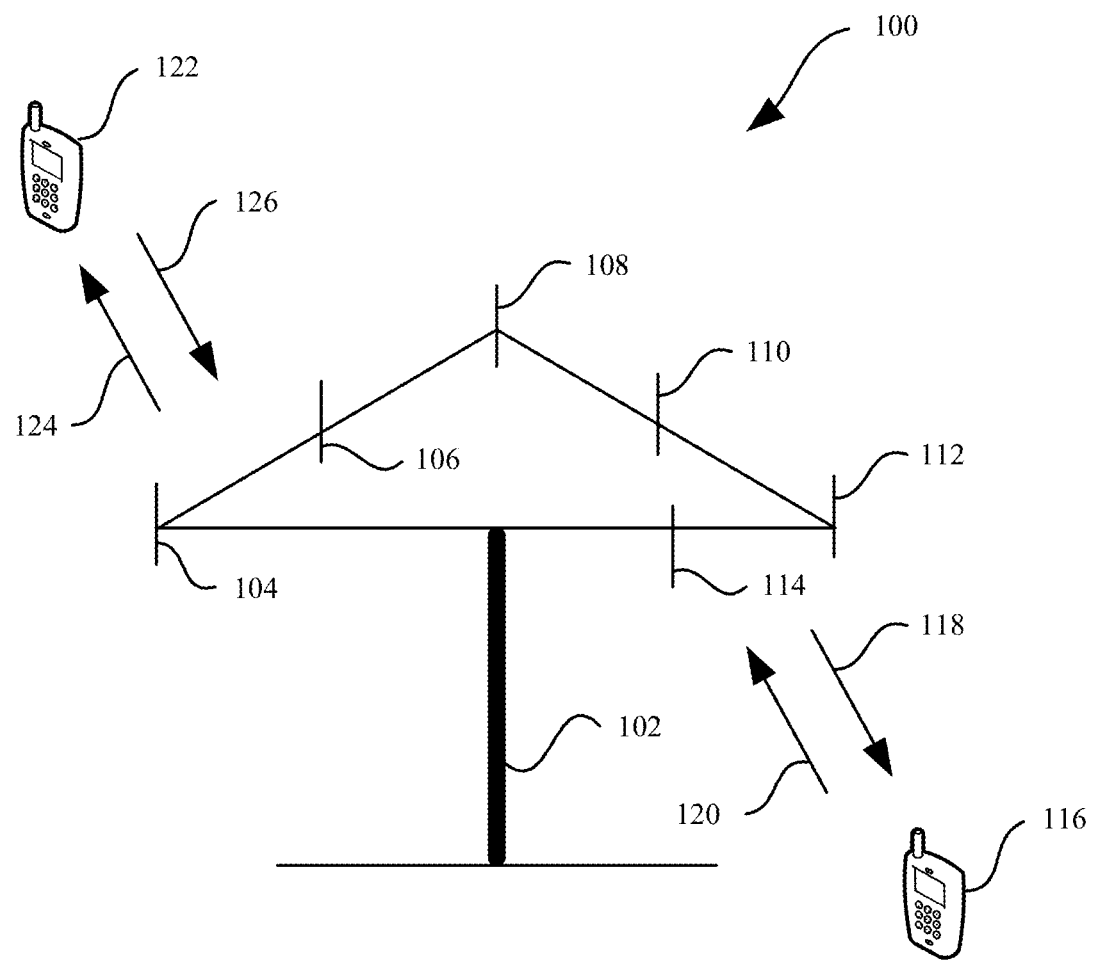
FIG. 1 is a schematic diagram of a scenario of a communications system to which an embodiment of this application may be applied.

The following describes technical solutions of this application with reference to accompanying drawings.

Embodiments of this application may be applied to various communications systems. Therefore, the following descriptions are not limited to a particular communications system. For example, the embodiments of this application may be applied to a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a wireless local area network (WLAN), wireless fidelity (WiFi) and next-generation communications system, namely, a fifth-generation (5G) communications system, for example, a new radio (NR) system.

In the embodiments of this application, a network device may be a base transceiver station (BTS) in the global system for mobile communications (GSM) or in the code division multiple access (CDMA) system, or may be a NodeB (NB) in the wideband code division multiple access (WCDMA) system, or may be an evolved NodeB (evolutional node B, eNB/eNodeB) in the long term evolution (LTE) system, or a relay station or an access point, or a network device in a future 5G network, for example, a transmission point (TRP or TP) in the NR system, a base station (gNB) in the NR system, a radio frequency unit in the NR system, for example, a remote radio unit, or an antenna panel or a group of antenna panels (including a plurality of antenna panels) of a base station in a 5G system. Different network devices may be located in a same cell, or may be located in different cells. This is not limited herein.

In some deployments, the gNB may include a centralized unit (CU) and a distributed unit (DU). The gNB may further include a radio frequency unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer is eventually converted into information at the PHY layer, or is converted from information at the PHY layer. Therefore, in this architecture, higher layer signaling, such as RRC layer signaling or PHCP layer signaling, may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

In the embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, an unmanned aerial vehicle, a terminal device in the future 5G network, a terminal device in a future evolved public land mobile network (PLMN), or the like. This is not limited in the embodiments of this application.

As an example instead of a limitation, in the embodiments of this application, the terminal device may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with other devices such as smartphones, for example, various smart bands or smart jewelry for monitoring physical signs.

The embodiments of this application may be applied to any one of the foregoing communications systems. For example, the embodiments of this application may be applied to the LTE system and a subsequent evolved system such as 5G, or other wireless communications systems using various radio access technologies, for example, a system using an access technology such as code division multiple access, frequency division multiple access, time division multiple access, orthogonal frequency division multiple access, or single-carrier frequency division multiple access, especially applicable to a scenario in which a channel information feedback is required and/or a two-stage precoding technology is applied, for example, a wireless network to which a massive array antenna (massive multiple-input multiple-output, M-MIMO) technology is applied, or a wireless network to which a distributed antenna technology is applied.

FIG. 1 is a schematic diagram of a scenario of a communications system to which an embodiment of this application may be applied. As shown in FIG. 1, the communications system 100 includes a network device 102, and the network device 102 may include a plurality of antenna groups. Each antenna group may include a plurality of antennas. For example, one antenna group may include antennas 104 and 106, another antenna group may include antennas 106 and 110, and an additional group may include antennas 112 and 114. FIG. 1 shows two antennas for each antenna group, but each group may include more or fewer antennas. The network device 102 may additionally include a transmitter chain and a receiver chain. A person of ordinary skill in the art may understand that both of the transmitter chain and the receiver chain may include a plurality of components (for example, a processor, a modulator, a multiplexer, a demodulator, a demultiplexer, and an antenna) related to signal sending and receiving.

The network device 102 may communicate with a plurality of terminal devices (such as a terminal device 116 and a terminal device 122). However, it may be understood that the network device 102 may communicate with any quantity of terminal devices that are similar to the terminal device 116 or 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (frequency division duplex, FDD) system, the forward link 118 may use a frequency band different from that used by the reverse link 120, and the forward link 124 may use a frequency band different from that used by the reverse link 126.

For another example, in a time division duplex (time division duplex, TDD) system and a full duplex (full duplex) system, the forward link 118 and the reverse link 120 may use a same frequency band, and the forward link 124 and the reverse link 126 may use a same frequency band.

Each antenna group and/or area designed for communication is referred to as a sector of the network device 102. For example, the antenna group may be designed to communicate with a terminal device in the sector within coverage of the network device 102. In a process in which the network device 102 separately communicates with the terminal devices 116 and 122 by using the forward links 118 and 124, a transmit antenna of the network device 102 can improve signal-to-noise ratios of the forward links 118 and 124 through beamforming. In addition, compared with a manner in which a network device sends, by using a single antenna, a signal to all terminal devices served by the network device, when the network device 102 sends, through beamforming, a signal to the terminal devices 116 and 122 that are randomly scattered within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may code the data for transmission. In one embodiment, the wireless communications sending apparatus may obtain (for example, generate, receive from another communications apparatus, or store in a memory) a particular quantity of data bits to be sent, over a channel, to the wireless communications receiving apparatus. The data bit may be included in a transport block (or a plurality of transport blocks) of the data, and the transport block may be segmented to produce a plurality of code blocks.

In addition, the communications system 100 may be a public land mobile network PLMN, a device-to-device (D2D) network, a machine-to-machine (M2M) network, or another network. FIG. 1 is merely an example of a simplified schematic diagram for ease of understanding, and the network may further include another network device that is not shown in FIG. 1.

Figure 2:
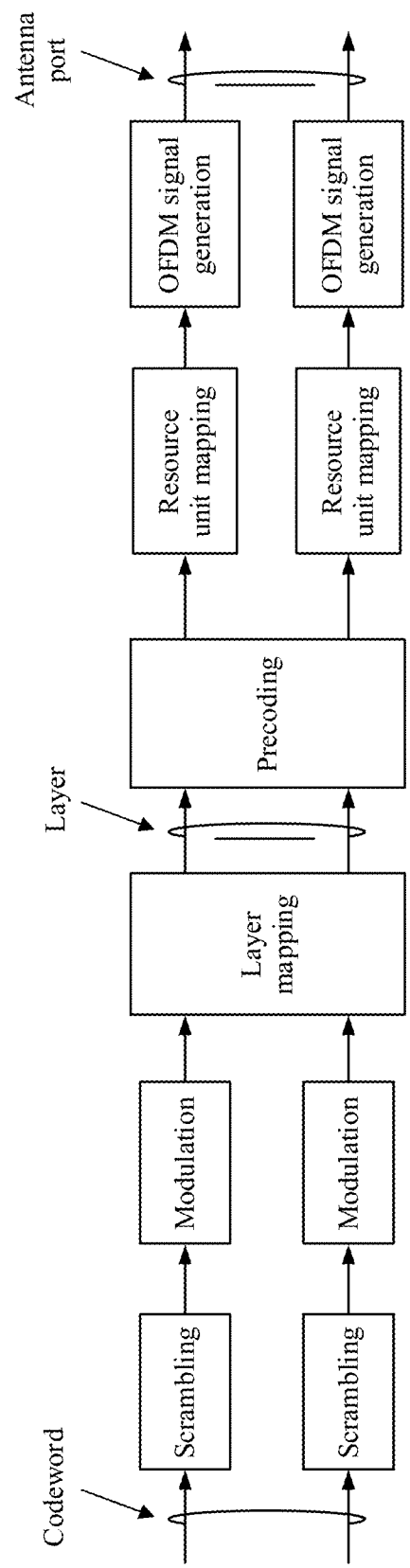
FIG. 2 is a schematic diagram of a data processing procedure according to an embodiment of this application.

FIG. 2 shows main operations of a data processing procedure performed by a transmit end (for example, a network device) before data is sent by using an orthogonal frequency division multiplexing (OFDM) symbol in a MIMO transmission scenario. As shown in FIG. 2, a codeword obtained after a service stream from an upper layer (for example, a media access control (MAC) layer) undergoes channel coding is scrambled, modulated, and layer-mapped to one or more layers, and is then precoded and mapped to a resource unit. Finally, a modulated symbol is sent by using an antenna port.

Correspondingly, a receive end (for example, a terminal device) may demodulate data. For each data processing procedure, refer to descriptions in an existing standard.

A MIMO technology mainly provides space diversity and spatial multiplexing gains. In MIMO, signals with same information are transmitted through different paths by using a plurality of transmit antennas while a plurality of independent fading signals of a same data symbol can be obtained at a receive end, so that diversity is obtained, thereby improving receiving reliability. The space diversity in the MIMO technology can be used to avoid channel fading.

According to a precoding technology, not only interference between a plurality of users in a MIMO system can be effectively suppressed, but also a system capacity can be greatly increased while an algorithm at the receive end is greatly simplified.

During precoding, a to-be-transmitted signal is preprocessed at the transmit end by using known channel state information CSI, that is, the to-be-transmitted signal is processed by using a precoding matrix that matches a channel resource, so that the processed to-be-transmitted signal can adapt to a channel environment, thereby eliminating the interference between the users, reducing a system bit error rate, increasing the system capacity, and reducing transmit power.

Therefore, received signal quality (for example, a signal to interference plus noise ratio (SINR)) is improved by precoding the to-be-transmitted signal. Therefore, according to the precoding technology, a transmit end device and a plurality of receive end devices can perform transmission on a same time-frequency resource, that is, multi-user multiple-input multiple-output (MU-MIMO) is implemented.

To obtain a precoding matrix that can adapt to a channel, the transmit end usually performs channel estimation in advance by sending a reference signal, to obtain feedback from the receive end, so that a relatively accurate precoding matrix is determined to precode to-be-sent data. In one embodiment, the transmit end may be a network device, the receive end may be a terminal device, and the reference signal may be a reference signal used for downlink channel measurement, for example, a channel state information reference signal (CSI-RS). The terminal device may perform CSI measurement based on a received CSI-RS, and feed back CSI of a downlink channel to the network device. Alternatively, the transmit end may be a terminal device, the receive end may be a network device, and the reference signal may be a reference signal used for uplink channel measurement, for example, a sounding reference signal (SRS). The network device may perform CSI measurement based on a received SRS, to indicate CSI of an uplink channel to the terminal device. For example, the CSI may include but is not limited to a precoding matrix indicator (PMI), a rank indication (RI), and a channel quality indication (CQI).

It needs to be understood that a communication manner applicable to the reference signal and a type of the reference signal are not particularly limited in this application. For example, for downlink data transmission, the transmit end may be, for example, a network device, the receive end may be, for example, a terminal device, and the reference signal may be, for example, a channel state information reference signal (CSI-RS). For uplink data transmission, the transmit end may be, for example, a terminal device, the receive end may be, for example, a network device, and the reference signal may be, for example, a sounding reference signal (SRS). For device-to-device (D2D) data transmission, the transmit end may be, for example, a terminal device, the receive end may be, for example, a terminal device, and the reference signal may be, for example, an SRS.

It needs to be understood that the foregoing listed types of the reference signals are merely examples for description, and do not need to be construed as any limitation on this application. A possibility that another reference signal is used to implement a same function or a similar function is not excluded in this application.

The evolution of a multi-antenna technology has resulted in increase of a quantity of antenna ports. A plurality of antenna panels may be configured for a same network device due to the increase of the quantity of antenna ports, so that a plurality of antenna ports are configured on the plurality of antenna panels. For example, at least one antenna port is configured on each antenna panel, and the at least one antenna port configured on each antenna panel may be referred to as an antenna port group.

Figures 3, 4:
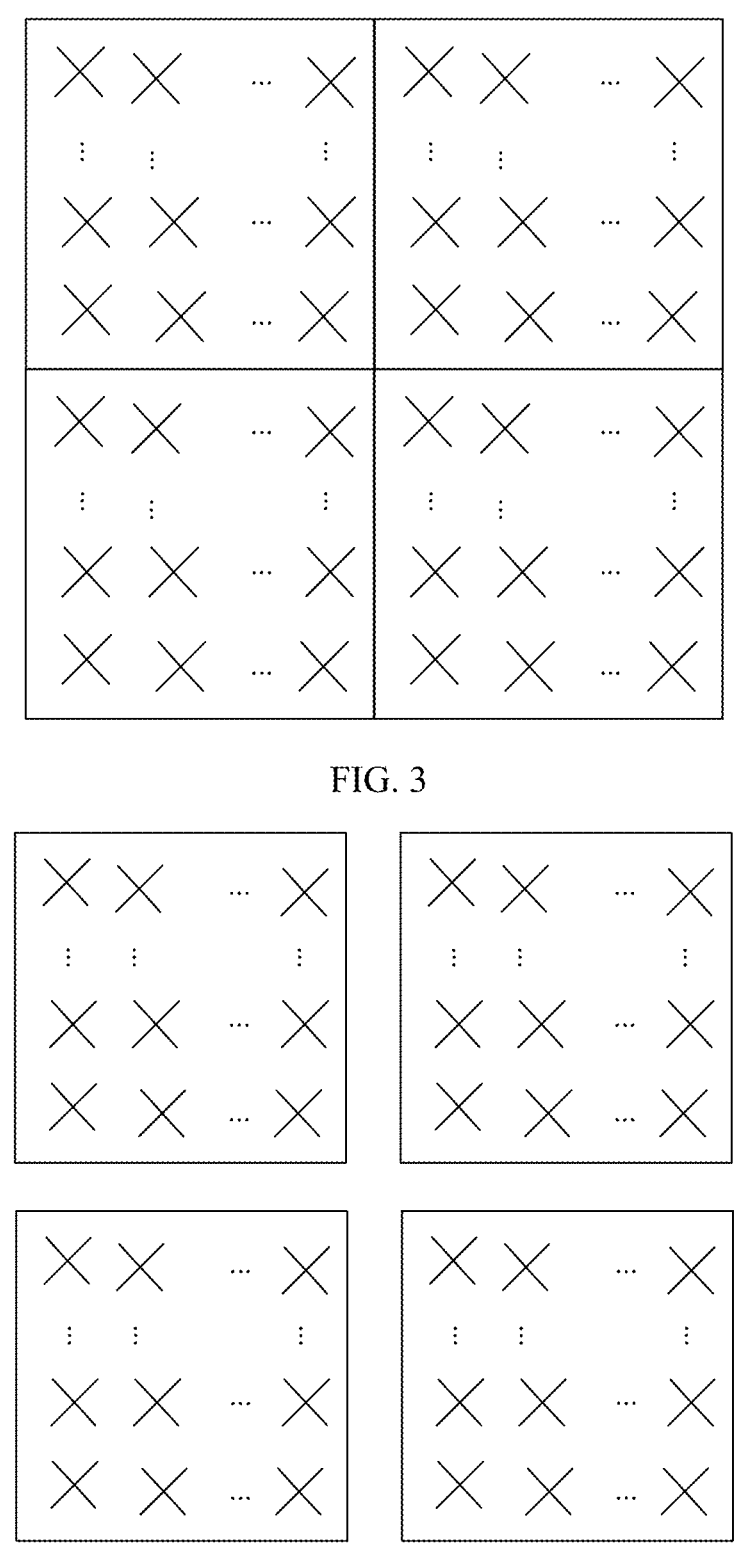

For example, in an NR communications system, an antenna array of the network device may include a plurality of antennas in two dimensions. For example, as shown in FIG. 3 and FIG. 4, a first dimension may be a horizontal dimension, and a second dimension may be a vertical dimension. These antennas may be cross polarization antennas, namely, antennas having two polarization directions. In FIG. 3 and FIG. 4, a straight line tilting towards a first direction represents an antenna in one polarization direction, and a straight line tilting towards a second direction represents an antenna in another polarization direction. Each X in FIG. 3 and FIG. 4 represents two antenna ports in different polarization directions. In addition, these antennas may be distributed in different antenna panels, and the different antenna panels are represented by using squares in FIG. 3 and FIG. 4. As shown in FIG. 3, there may be uniform spacings between antenna elements from different panels. Alternatively, as shown in FIG. 4, there may be non-uniform spacings between antenna elements from different panels.

In the prior art, a single-panel high-precision codebook is defined, but a multi-panel high-precision codebook is not defined yet. If a multi-panel codebook is determined in an existing single-panel high-precision codebook manner, that is, a precoding matrix in the multi-panel codebook may be formed by splicing precoding matrices in a plurality of single-panel codebooks, different antenna panels are distinguished by using antenna panel phase factors. Consequently, accuracy is not high.

If only the precoding matrices in the plurality of single-panel codebooks are spliced into precoding matrices in the plurality of single-panel codebooks, information fed back by the receive end is multiplied, and consequently, network performance is affected.

In view of the foregoing problem, the embodiments of this application provides a multi-panel precoding matrix indication method. In the embodiments of this application, accuracy of a codebook can be improved.

To make the embodiments of this application easier to be understood, the following first describes some descriptions in the embodiments of this application. These descriptions do not need to be considered as a limitation on the protection scope claimed in this application.

In a MIMO transmission scenario, to eliminate partial or all interference between data streams, a signal transmit end (for example, a terminal device) needs to precode a to-be-transmitted signal by using a precoding matrix. A relationship between a to-be-transmitted signal x and a to-be-received signal y after precoding processing may be shown in the following formula:

$y=HWx+n$, where x is a to-be-transmitted signal of a transmit end (for example, a network device), y is a to-be-received signal of a receive end (for example, a terminal device), H is a channel matrix, W is a precoding matrix, and n represents noise.

The embodiments of this application mainly relates to a solution in which a receive end (for example, the receive end is a terminal device during downlink transmission) feeds back a precoding matrix to a transmit end (for example, a network device) based on a reference signal.

For ease of understanding and description, as an example instead of a limitation, the following describes an execution process and an execution action of a communication method in a communications system in this application.

It needs to be understood that the communication method provided in this application is applicable to uplink transmission and downlink transmission. During downlink transmission, in the embodiments of this application, a transmit end device may be a network device, a receive end device may be a terminal device, and a reference signal may be a reference signal used for downlink channel measurement, for example, a CSI-RS. During uplink transmission, in the embodiments of this application, a transmit end device may be a terminal device, a receive end device may be a network device, and a reference signal may be a reference signal used for uplink channel measurement, for example, an SRS. It needs to be understood that the foregoing listed reference signals used for uplink channel measurement and downlink channel measurement are merely examples for description, and do not need to constitute any limitation on the embodiments of this application. A possibility of defining, in an existing protocol or a future protocol, another reference signal used for uplink/downlink channel measurement is not excluded in this application.

Figure 5:
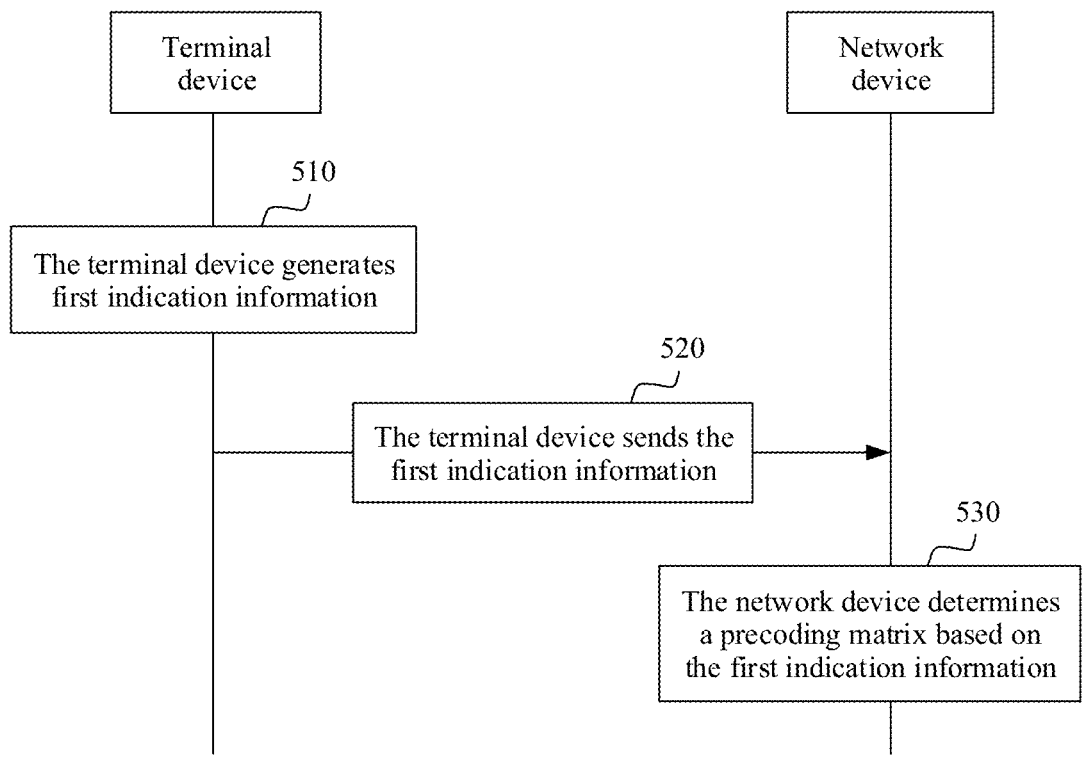
FIG. 5 is a schematic flowchart of a communication method according to an embodiment of this application.

As an example instead of a limitation, the following describes the method according to the embodiments of this application with reference to FIG. 5. FIG. 5 is a schematic flowchart of a communication method according to an embodiment of this application. The method shown in FIG. 5 is described from a perspective of interaction between a network device and a terminal device. FIG. 5 shows a method according to an embodiment of this application in a downlink transmission scenario. In one embodiment, a method 500 shown in FIG. 5 includes the following operations.

510: The terminal device generates first indication information.

The first indication information is used to indicate a precoding matrix, the precoding matrix is applied to at least one antenna panel and includes at least one precoding vector, each precoding vector includes at least one subvector, each subvector corresponds to an antenna port on the antenna panel and includes two polarization vectors, and each polarization vector is generated by performing weighted combination on a plurality of basis vectors.

In one embodiment, the network device sends, to the terminal device, a reference signal used for channel measurement, and the terminal device performs the channel measurement based on the reference signal, to generate the first indication information.

For example, the reference signal is a CSI-RS. Optionally, the reference signal may alternatively be another signal used for channel measurement. This embodiment of this application is not limited thereto.

It needs to be understood that "first", "second", and the like in the embodiments of this application are merely used for differentiation, and impose no limitation on the embodiments of this application.

The terminal device may determine, based on the reference signal such as the CSI-RS, a precoding matrix W that is expected by the terminal device and used when the network device sends downlink data, and generate the first indication information based on W.

For example, in a downlink communication process, the terminal device determines a channel matrix based on the reference signal transmitted by the network device, determines the precoding matrix based on the channel matrix and a codebook, and feeds back, to the network device, related information (the first indication information in this embodiment of this application) used to obtain the precoding matrix.

For the network device and the terminal device, there is a codebook or a precoding matrix set for each rank (or each rank indication). When a rank is given, each precoding matrix is indicated by precoding matrix indication information (namely, the first indication information). In one embodiment, the first indication information may uniquely indicate a precoding matrix in the precoding matrix set. Therefore, after determining the precoding matrix W, the terminal device may obtain the corresponding first indication information.

It needs to be understood that the terminal device may determine the rank by using a method well-known to a person skilled in the art. For brevity, details are not described herein. One rank value corresponds to one rank indication. The terminal device sends the rank indication to a base station, to indicate an amount of downlink data that the terminal device expects to be sent in a spatial multiplexing manner. For example, a value range of the rank is 1 to 8, and the rank indication is represented by using 3 bits. When the rank indication is 000, it represents that the rank is 1; when the rank indication is 001, it represents that the rank is 2; and so on. In conclusion, when a value is taken for a rank, there is a value of a rank indication corresponding to the rank.

It needs to be understood that, in this embodiment of this application, the terminal device may alternatively determine, in another manner, the precoding matrix and the first indication information corresponding to the precoding matrix. For example, a manner of determining a precoding matrix and precoding matrix indication information in the prior art may be used. This embodiment of this application is not limited thereto.

To make the embodiments of this application easier to be understood, nouns in the embodiments of this application are explained and described below.

A quantity of precoding vectors in the precoding matrix (namely, a quantity of columns of the precoding matrix) corresponds to a quantity of data layers. For example, when the RI is equal to 1, the precoding matrix includes one precoding vector; when the RI is equal to 2, the precoding matrix includes two precoding vectors; and so on.

In this embodiment of this application, the network device has at least one panel, and each precoding vector has at least one subvector that is in a one-to-one correspondence with an antenna port on the at least one panel. For example, when the network device has two panels, each precoding vector has two subvectors; when the network device has four panels, each precoding vector has four subvectors; and so on.

Each subvector includes two polarization vectors. For example, the two polarization vectors include a first polarization vector and a second polarization vector that respectively correspond to two polarization directions of the antenna shown in FIG. 3 or FIG. 4.

It needs to be understood that FIG. 3 and FIG. 4 each show a case in which a network device has a plurality of panels. However, this embodiment of this application is not limited thereto. When the network device includes a single-panel antenna, a codebook structure and a precoding matrix indication method according to the embodiments of this application is also applicable.

Optionally, in an embodiment, the precoding matrix is:

$$\frac{1}{\alpha}[P_1 \quad P_2 \quad \ldots \quad P_r],$$

where $P_l$ is the precoding vector, r≥l≥1, r≥1, r represents the quantity of data layers, $$\frac{1}{\alpha}$$

is a normalized coefficient, and $$0 < \frac{1}{\alpha} \leq 1;$$

the precoding vector $P_l$ is:

$$\begin{bmatrix} S_1^l \\ S_2^l \\ \vdots \\ S_{N_g}^l \end{bmatrix},$$

where $S_i^l$ is a subvector of the precoding vector $P_l$, $N_g \geq i \geq 1$, $N_g \geq 1$, and $N_g$ is a quantity of the at least one antenna panel; and the subvector $S_i^l$ is:

$$\begin{bmatrix} Q_{1,i}^l \\ Q_{2,i}^l \end{bmatrix},$$

where $Q_{x,i}^l$ is a polarization vector of the subvector $S_i^l$, and x is equal to 1 or 2. $Q_{1,i}^l$ represents the first polarization vector, and $Q_{2,i}^l$ represents the second polarization vector.

The following describes in detail, with reference to examples, a form of the precoding matrix in this embodiment of this application and a form of information indicated by the first indication information indicating the precoding matrix.

It needs to be understood that, in this specification, the information indicated by the first indication information is referred to as to-be-indicated information. In one embodiment, the to-be-indicated information is indicated in a plurality of manners. The to-be-indicated information may be, for example, but not limited to, directly indicated. For example, the to-be-indicated information or an index of the to-be-indicated information is directly indicated. Alternatively, the to-be-indicated information may be indirectly indicated by indicating other information, where there is an association relationship between the other information and the to-be-indicated information. Alternatively, only a part of the to-be-indicated information may be indicated, and another part of the to-be-indicated information is known or pre-agreed. For example, particular information may be indicated by using a pre-agreed (for example, protocol-specified) arrangement order of various pieces of information, thereby reducing indication overheads to some extent. In addition, common parts of the various pieces of information may be further identified and uniformly indicated, to reduce indication overheads caused by separate indication of same information.

In one embodiment, for indications of various parameters, for example, but not limited to, $B_m$, $\varphi_m$, $a_{m,1,i}^l$, $p_{m,1,i}^l$, and $c_i^l$, refer to, for example, but not limited to, indications of similar parameters in a new radio (NR) standard, for example, refer to indications of similar parameters in a type II (type II) codebook in the NR standard. Certainly, another indication manner may also be used. In addition, with reference to a similar manner in the NR standard, one or more of the parameters such as $\varphi_m$, $a_{m,1,i}^l$, $p_{m,1,i}^l$, and $c_i^l$ may alternatively be indicated in a normalization manner, to normalize another parameter of a same type based on a reference parameter. In this case, in an indication process, a normalization result of the another parameter of the same type is indicated. A particular value of the reference parameter does not need to be indicated, but a default value, for example, a preset constant (for example, 1), of the reference parameter is specified in the standard. Although the particular value of the reference parameter does not need to be indicated, other information associated with the reference parameter may need to be indicated. Certainly, the other information may alternatively not need to be indicated. It can be learned that a plurality of parameter values of the parameter of the same type may be indicated by using different methods. In addition, the foregoing normalization operation may be performed for all antenna panels, or may be performed for each antenna panel. A indication manner is not limited in this embodiment of this application. In conclusion, in a process of indicating each parameter, not all parameter values of the parameter of the same type need to be indicated. Therefore, the indication of the foregoing parameters needs to be understood as indication of some or all of the foregoing parameters.

In this embodiment of this application, the to-be-indicated information may be sent as a whole, or may be divided into a plurality of pieces of sub-information and sent separately. In addition, sending periodicities and/or sending occasions of these pieces of sub-information may be the same or may be different. A sending method is not limited in this application. The sending periodicities and/or sending occasions of these pieces of sub-information may be predefined, for example, predefined in a protocol, or may be configured by a transmit end device by sending configuration information to a receive end device. The configuration information may include, for example, but not limited to, one or a combination of at least two of downlink control information (DCI) and higher layer signaling such as radio resource control (RRC) signaling/medium access control (MAC) layer signaling.

In this embodiment of this application, the first indication information may be a precoding vector indicator (PMI), or may be other indication information. The first indication information may be carried in one or more messages in the prior art and sent by the receive end device to the transmit end device, or may be carried in one or more messages newly designed in this application and sent by the receive end device to the transmit end device.

Optionally, $$Q_{x,i}^l = \sum_{m=1}^{L} A_{m,x,i}^l B_m,$$

where $B_m$, is the basis vector, $L \geq m > 1$, $L \geq 2$, L represents a quantity of basis vectors that are included in each polarization vector, and $A_{m,x,i}^l$ is a weight of the basis vector $B_m$.

It can be learned from the foregoing formula that, in this embodiment of this application, an $m^{th}$ basis vector $B_m$, that is included in the first polarization vector is the same as an $m^{th}$ basis vector $B_m$, that is included in the second polarization vector. In other words, two groups of basis vectors (where each group of basis vectors includes L basis vectors) that are respectively included in two polarization vectors are the same. A difference between the two polarization vectors is that a same basis vector in each polarization direction has a respective weight $A_{m,x,i}^l$.

Optionally, in another embodiment, the two groups of basis vectors that are included in the two polarization vectors may not be completely the same or may be completely different.

Optionally, in this embodiment of this application, $B_m$, may be a Kronecker product of two vectors, a dimension of one vector is $N_1$, a dimension of the other vector is $N_2$, a dimension of $B_m$, is $N_1 N_2$, and each antenna panel has $N_1$ antenna port pairs in a first dimension and $N_2$ antenna port pairs in a second dimension.

It needs to be understood that, in this embodiment of this application, the antenna port (or briefly referred to as a port) may be understood as a reference signal port, and one reference signal corresponds to one antenna port. For example, the reference signal may include a channel state information reference signal CSI-RS, a DMRS, and an SRS. Different types of reference signals are used to implement different functions. The antenna port in this application may be a CSI-RS port, a DMRS port, or an SRS port. For example, during downlink transmission, when the reference signal that is sent by the network device and that is used for the channel measurement is the CSI-RS, the antenna port may be referred to as the CSI-RS port. This embodiment of this application is not limited thereto.

It needs to be understood that, in this embodiment of this application, the "antenna port pair" may represent two antenna ports in different polarization directions. For example, "X" in FIG. 3 or FIG. 4 represents an antenna port pair.

In one embodiment, $N_1$ may represent a quantity of "X" in the first dimension of each antenna panel in FIG. 3 and FIG. 4, and $N_2$ may represent a quantity of "X" in the second dimension of each antenna panel in FIG. 3 and FIG. 4. In this case, there may be $2N_1 * N_2$ antenna ports on each of the plurality of antenna panels in FIG. 3 or FIG. 4. In this embodiment of this application, each antenna panel may correspond to one antenna port set, and each antenna port set may include $2N_1 * N_2$ antenna ports.

Optionally, one of the two vectors that are included in $B_m$, may be a one-dimensional DFT vector v, and the other vector may be a one-dimensional DFT vector u. In this case, a form of $B_m$ may be as follows:

$$B_m = v \otimes u.$$

For example, $$v = \begin{bmatrix} 1 & e^{j\frac{2\pi t}{O_1 N_1}} & \cdots & e^{j\frac{2\pi t(N_1-1)}{O_1 N_1}} \end{bmatrix}^T, \text{ and}$$

$$u = \begin{cases} \begin{bmatrix} 1 & e^{j\frac{2\pi z}{O_2 N_2}} & \cdots & e^{j\frac{2\pi z(N_2-1)}{O_2 N_2}} \end{bmatrix}^T, & N_2 > 1 \\ 1, & N_2 = 1 \end{cases},$$

where t and z represent linear functions, and $O_1$ and $O_2$ represent oversampling factors. For content related to the foregoing DFT vectors v and u, refer to the prior art. Details are not described herein.

As an example instead of a limitation, in an implementation, the basis vector $B_m$ in this embodiment of this application may also be referred to as a beam vector, and $B_m$ may be a beam vector in a beam vector set.

For example, the beam vector set may include 32 beam vectors. The beam vector set is:

$$B=[b_0 b_1 \ldots b_{31}], \text{ where}$$

B represents the beam vector set, and $b_0$ to $b_{31}$ respectively represent beam vectors of the first beam to the $32^{nd}$ beam (one vector corresponds to one transmit beam). It needs to be understood that there may alternatively be another quantity of beam vectors in the beam vector set B. This embodiment of this application is not limited thereto.

As an example instead of a limitation, in an implementation, the beam vector set B may be divided into a plurality of beam vector clusters, and L basis vectors $B_m$ corresponding to $Q_{x,i}^l$ may correspond to one beam vector cluster.

For example, the beam vector set B is divided into 16 beam vector clusters. There are four beam vectors in each beam vector cluster, and two beam vectors in two adjacent beam vector clusters overlap. $X^{(k)}$ represents a $k^{th}$ beam vector cluster, that is:

$$X^{(k)} \in \{[b_{2k \bmod 32} b_{(2k+1) \bmod 32} b_{(2k+2) \bmod 32} b_{(2k+3) \bmod 32}], k=0,1,\ldots,15\}.$$

When L=4, the L basis vectors $B_m$ corresponding to $Q_{x,i}^l$ may be one of the foregoing beam vector clusters.

It needs to be understood that a beam vector cluster division manner in this embodiment of this application is merely an example. This embodiment of this application is not limited thereto. In addition, in this embodiment of this application, a change in a quantity of beams may indicate a corresponding change in a quantity of corresponding beam vector clusters. Different values of L may also correspond to different beam vector cluster division forms. This embodiment of this application is not limited thereto.

It needs to be understood that, in this embodiment of this application, the basis vector $B_m$ may alternatively be selected by using a plurality of methods. During actual application, an appropriate method may be selected based on a particular requirement.

For example, as an example instead of a limitation, in another implementation, $B_m$ used to construct the basis vector is selected according to a degree of proximity to the precoding vector. For example, $B_m$ is selected by using an inner product or a Euclidean distance.

It needs to be understood that in this embodiment of this application, the weight $A_{m,x,i}^l$ of the basis vector $B_m$ may have a plurality of possible forms. The following describes the forms in detail based on different cases.

Form 1:

$$A_{m,x,i}^l = a_{m,x,i}^l p_{m,x,i}^l, \text{ where}$$

$a_{m,x,i}^l$ represents an amplitude coefficient, and $p_{m,x,i}^l$ represents a phase coefficient; and $$A_{m,2,i}^l = \varphi_m A_{m,1,i}^l, \text{ where}$$

$\varphi_m$ represents a polarization phase factor, and the first indication information is used to indicate $B_m$, $\varphi_m$, $a_{m,1,i}^l$, and $p_{m,1,i}^l$.

In one embodiment, it can be learned from the foregoing expansion formula $$Q_{x,i}^l = \sum_{m=1}^{L} A_{m,x,i}^l B_m$$

of the polarization vector $Q_{x,i}^l$ of the subvector $S_i^l$ that the two groups of basis vectors (where each group of basis vectors includes L basis vectors) that are respectively included in the two polarization vectors are the same, and a difference between the two polarization vectors is that the two groups of basis vectors have separately determined weights. It can be learned from the foregoing formula $$A_{m,2,i}^l = \varphi_m A_{m,1,i}^l \text{ that}$$

$$S_1^l = \begin{bmatrix} Q_{1,i}^l \\ Q_{2,i}^l \end{bmatrix} = \begin{bmatrix} \sum_{m=1}^{L} A_{m,1,i}^l B_m \\ \sum_{m=1}^{L} A_{m,2,i}^l B_m \end{bmatrix} = \begin{bmatrix} \sum_{m=1}^{L} A_{m,1,i}^l B_m \\ \sum_{m=1}^{L} \varphi_m A_{m,1,i}^l B_m \end{bmatrix}$$

$$= \left[ \sum_{m=1}^{L} \begin{pmatrix} 1 \\ \varphi_m \end{pmatrix} \otimes (A_{m,1,i}^l B_m) \right]$$

$$= \left[ \sum_{m=1}^{L} \begin{pmatrix} 1 \\ \varphi_m \end{pmatrix} \otimes (a_{m,1,i}^l p_{m,1,i}^l B_m) \right].$$

It can be learned from a variation of the foregoing formula of $S_i^l$ that, because a weight of the basis vector corresponding to the second polarization vector is a product of a weight of the same basis vector corresponding to the first polarization vector and $\varphi_m$, in this embodiment of this application, a weight parameter of the precoding matrix may be simplified. In this embodiment of this application, each subvector may be indicated by indicating weights of a group of basis vectors and the polarization phase factor instead of indicating weights of the two groups of basis vectors of the two polarization vectors. Therefore, in this embodiment of this application, the size of indication information of the precoding matrix can be reduced, and system performance can be improved.

Correspondingly, when l=1, the form of the precoding matrix in this embodiment of this application may be:

$$W = \frac{1}{\alpha} \begin{bmatrix} \sum_{m=1}^{L} a_{m,1,1}^{l} p_{m,1,1}^{l} \begin{pmatrix} B_m \\ \varphi_m B_m \end{pmatrix} \\ \sum_{m=1}^{L} a_{m,1,2}^{l} p_{m,1,2}^{l} \begin{pmatrix} B_m \\ \varphi_m B_m \end{pmatrix} \\ \vdots \\ \sum_{m=1}^{L} a_{m,1,N_g}^{l} p_{m,1,N_g}^{l} \begin{pmatrix} B_m \\ \varphi_m B_m \end{pmatrix} \end{bmatrix},$$

where $$\frac{1}{\alpha}$$

is a normalized coefficient. For example, $$\frac{1}{\alpha} = \frac{1}{\sqrt{2 N_1 N_2 \sum_{i=1}^{N_g} \sum_{m=1}^{L} (a_{m,1,i})^2}}.$$

It needs to be understood that, in the precoding matrix in this embodiment of this application, two groups of basis vectors corresponding to two polarization vectors of each antenna panel are the same, that is, each group of basis vectors is $B_1$ to $B_L$. However, this embodiment of this application is not limited thereto. For example, the two groups of basis vectors corresponding to the two polarization vectors of the antenna panel may not be completely the same or may be completely different. In other words, basis vectors in each polarization direction are independently determined.

It needs to be further understood that, in the precoding matrix in this embodiment of this application, each group of basis vectors corresponding to different antenna panels is $B_1$ to $B_L$. However, this embodiment of this application is not limited thereto. For example, a plurality of groups of basis vectors corresponding to the different antenna panels may not be completely the same or may be completely different. In other words, basis vectors of each antenna panel are independently determined, or basis vectors of different panels are not independently determined and have an association relationship.

It needs to be further understood that, in the precoding matrix in this embodiment of this application, each group of polarization antenna phase factors corresponding to different subvectors is $\varphi_1$ to $\varphi_L$. However, this embodiment of this application is not limited thereto. For example, a plurality of groups of polarization antenna phase factors corresponding to the different subvectors may not be completely the same or may be completely different. In other words, polarization antenna phase factors of each subvector are independently determined. These descriptions are also applicable to another embodiment in this specification. This application is not limited thereto.

As an example instead of a limitation, the first indication information may include one or more PMIs. For example, the first indication information includes two PMIs: a first PMI and a second PMI.

In one embodiment, the first PMI is used to indicate $B_m$, $\varphi_m$, and $a_{m,1,i}^{l}$, and the second PMI is used to indicate $p_{m,1,i}^{l}$.

In one embodiment, $a_{m,1,i}^{l}$ includes a bandwidth component of a scheduling bandwidth of the terminal device and a sub-band component of the scheduling bandwidth. The first PMI is used to indicate $B_m$, $\varphi_m$, and the bandwidth component, and the second PMI is used to indicate $p_{m,1,i}^{l}$ and the sub-band component.

Optionally, in another embodiment, the network device may send configuration information to the terminal device, to indicate whether $a_{m,1,i}^{l}$ includes the two components. For example, the configuration information is 1 bit. When a value of the configuration information is 1, it indicates that $a_{m,1,i}^{l}$ includes the two components; or when a value of the indication information is 0, it indicates that $a_{m,1,i}^{l}$ includes the bandwidth component, and does not include the sub-band component. Alternatively, when a value of the indication information is 0, it indicates that $a_{m,1,i}^{l}$ includes the two components; or when a value of the indication information is 1, it indicates that $a_{m,1,i}^{l}$ includes the bandwidth component, and does not include the sub-band component.

The foregoing describes an example of the precoding matrix when $$S_i^l = \left[ \sum_{m=1}^{L} a_{m,1,i}^{l} p_{m,1,i}^{l} \begin{pmatrix} B_m \\ \varphi_m B_m \end{pmatrix} \right] \text{ and } l = 1.$$

Optionally, in this embodiment of this application, as an example instead of a limitation, the subvector in the precoding matrix may be transformed as follows:

$$S_i^l = \left[ \sum_{m=1}^{L} a_{m,1,i}^{l} p_{m,1,i}^{l} \begin{pmatrix} B_m \\ B_m \end{pmatrix} \right],$$

or $$S_i^l = \left[ \sum_{m=1}^{L} a_{m,1,i}^{l} p_{m,1,i}^{l} \begin{pmatrix} \varphi_m B_m \\ B_m \end{pmatrix} \right],$$

or $$S_i^l = \left[ \sum_{m=1}^{L} a_{m,1,i}^{l} p_{m,1,i}^{l} \begin{pmatrix} 0 \\ B_m \end{pmatrix} \right],$$

or $$S_i^l = \left[ \sum_{m=1}^{L} a_{m,1,i}^{l} p_{m,1,i}^{l} \begin{pmatrix} B_m \\ 0 \end{pmatrix} \right].$$

Correspondingly, the precoding matrix is correspondingly transformed. For example, when $$S_i^l = \left[ \sum_{m=1}^{L} a_{m,1,i}^{l} p_{m,1,i}^{l} \begin{pmatrix} B_m \\ B_m \end{pmatrix} \right] \text{ and } l = 1,$$

the form of the precoding matrix is $$W = \frac{1}{\alpha}\begin{bmatrix} \sum_{m=1}^{L} a_{m,1,1}^l p_{m,1,1}^l \begin{pmatrix} B_m \\ B_m \end{pmatrix} \\ \sum_{m=1}^{L} a_{m,1,2}^l p_{m,1,2}^l \begin{pmatrix} B_m \\ B_m \end{pmatrix} \\ \vdots \\ \sum_{m=1}^{L} a_{m,1,N_g}^l p_{m,1,N_g}^l \begin{pmatrix} B_m \\ B_m \end{pmatrix} \end{bmatrix}.$$

Form 2:

$A_{m,x,i}{}^l = c_i{}^l a_{m,x,i}{}^l p_{m,x,i}{}^l$, where $a_{m,x,i}{}^l$ represents an amplitude coefficient, $p_{m,x,i}{}^l$ represents a phase coefficient, and $c_i{}^l$ represents an antenna panel phase factor.

In one embodiment, $c_1{}^l = 1$, and the first indication information is used to indicate $B_m$, $c_i{}^l (i \neq 1)$, $a_{m,x,i}{}^l$, and $p_{m,x,i}{}^l$.

In other words, in this embodiment of this application, a phase factor of another antenna panel may be normalized based on the antenna panel phase factor $c_1{}^l$ corresponding to a first antenna panel. Therefore, in this embodiment of this application, the phase factor of the first antenna panel may not be reported. Therefore, in this embodiment of this application, a weight parameter of the precoding matrix may be simplified, so that the size of indication information of the precoding matrix can be reduced, and system performance can be improved.

When $l=1$, it can be learned by substituting the foregoing form of $A_{m,x,i}{}^l$ into the foregoing formula of the precoding matrix that the form of the precoding matrix is:

$$W = \frac{1}{\alpha}\begin{bmatrix} \sum_{m=1}^{L} a_{m1,1}^l p_{m1,1}^l B_m \\ \sum_{m=1}^{L} a_{m,2,1}^l p_{m,2,1}^l B_m \\ \sum_{m=1}^{L} c_2^l a_{m,1,2}^l p_{m,1,2}^l B_m \\ \sum_{m=1}^{L} c_2^l a_{m,2,2}^l p_{m,2,2}^l B_m \\ \vdots \\ \sum_{m=1}^{L} c_{N_g}^l a_{m,1,N_g}^l p_{m,1,N_g}^l B_m \\ \sum_{m=1}^{L} c_{N_g}^l a_{m,2,N_g}^l p_{m,2,N_g}^l B_m \end{bmatrix},$$

where $\frac{1}{\alpha}$ is a normalized coefficient. For example, $$\frac{1}{\alpha} = \frac{1}{\sqrt{N_1 N_2 \sum_{i=1}^{N_g} \sum_{m=1}^{L} \sum_{r=1}^{2} (a_{m,r,i})^2}}.$$

Because the phase factor of the first antenna panel is 1, the phase factor does not need to be reported, and starting with the second antenna panel, the phase factor needs to be reported. For implementation, in this embodiment of this application, a phase factor of an $i^{th}$ ($i \neq 1$) antenna panel may be represented as $c_{i-1}{}^l$. Therefore, when $l=1$, the form of the precoding matrix may be transformed into:

$$W = \frac{1}{\alpha}\begin{bmatrix} \sum_{m=1}^{L} a_{m,1,1}^l p_{m,1,1}^l B_m \\ \sum_{m=1}^{L} a_{m,2,1}^l p_{m,2,1}^l B_m \\ \sum_{m=1}^{L} c_1^l a_{m,1,2}^l p_{m,1,2}^l B_m \\ \sum_{m=1}^{L} c_1^l a_{m,2,2}^l p_{m,2,2}^l B_m \\ \vdots \\ \sum_{m=1}^{L} c_{N_g-1}^l a_{m,1,N_g}^l p_{m,1,N_g}^l B_m \\ \sum_{m=1}^{L} c_{N_g-1}^l a_{m,2,N_g}^l p_{m,2,N_g}^l B_m \end{bmatrix},$$

where $\frac{1}{\alpha}$ is a normalized coefficient. For example, $$\frac{1}{\alpha} = \frac{1}{\sqrt{N_1 N_2 \sum_{i=1}^{N_g} \sum_{m=1}^{L} \sum_{r=1}^{2} (a_{m,r,i})^2}}.$$

Further, in another embodiment, in this embodiment of this application, the first antenna panel may be referred to as a reference panel, and a weight $A_{m,x,i}{}^l$ corresponding to the $i^{th}$ ($i \neq 1$) antenna panel may be represented in the following form:

$A_{m,x,i}{}^l = c_i{}^l A_{m,x,1}{}^l = c_i{}^l a_{m,x,1}{}^l p_{m,x,1}{}^l (i \neq 1)$, where $c_i{}^l (i \neq 1)$ represents a phase difference coefficient or a phase difference between an antenna port of the $i^{th}$ ($i \neq 1$) antenna panel and an antenna port of the reference panel. In this case, a form of a subvector corresponding to the $i^{th}$ ($i \neq 1$) antenna panel may be as follows:

$$S_i^l = \begin{bmatrix} Q_{1,i}^l \\ Q_{2,i}^l \end{bmatrix} = \begin{bmatrix} \sum_{m=1}^{L} A_{m,1,i}^l B_m \\ \sum_{m=1}^{L} A_{m,2,i}^l B_m \end{bmatrix} = \begin{bmatrix} \sum_{m=1}^{L} c_i^l A_{m,1,1}^l B_m \\ \sum_{m=1}^{L} c_i^l A_{m,2,1}^l B_m \end{bmatrix} = \begin{bmatrix} \sum_{m=1}^{L} c_i^l a_{m,1,1}^l p_{m,1,1}^l B_m \\ \sum_{m=1}^{L} c_i^l a_{m,2,1}^l p_{m,2,1}^l B_m \end{bmatrix}.$$

It can be learned from a variation of the foregoing formula of $S_i^l$ that, because a weight of a basis vector in the subvector corresponding to the $i^{th}$ ($i \neq 1$) antenna panel is a product of a weight of a same basis vector in a subvector corresponding to the reference panel and $c_i^l$ ($i \neq 1$), in this embodiment of this application, a weight parameter of the precoding matrix may be simplified. In this embodiment of this application, the precoding matrix may be indicated by indicating a weight of each basis vector in the subvector corresponding to the reference panel and the antenna phase factor instead of indicating a weight of each basis vector in subvectors of all panels. Therefore, in this embodiment of this application, the size of indication information can be reduced, and system performance can be improved.

It can be learned from a weight relationship between the panels that, when l=1, the form of the precoding matrix in this embodiment of this application is:

$$W = \frac{1}{\alpha} \begin{bmatrix} \sum_{m=1}^{L} a_{m,1,1}^l p_{m,1,1}^l B_m \\ \sum_{m=1}^{L} a_{m,2,1}^l p_{m,2,1}^l B_m \\ \sum_{m=1}^{L} c_2^l a_{m,1,1}^l p_{m,1,1}^l B_m \\ \sum_{m=1}^{L} c_2^l a_{m,2,1}^l p_{m,2,1}^l B_m \\ \vdots \\ \sum_{m=1}^{L} c_{N_g}^l a_{m,1,1}^l p_{m,1,1}^l B_m \\ \sum_{m=1}^{L} c_{N_g}^l a_{m,2,1}^l p_{m,2,1}^l B_m \end{bmatrix},$$

where $$\frac{1}{\alpha}$$

is a normalized coefficient. For example, $$\frac{1}{\alpha} = \frac{1}{\sqrt{N_g N_1 N_2 \sum_{i=1}^{L} \sum_{r=1}^{2} (a_{m,r,i})^2}}.$$

It needs to be understood that, in the precoding matrix in this embodiment of this application, two groups of basis vectors corresponding to two polarization vectors of each antenna panel are the same, that is, each group of basis vectors is $B_1$ to $B_L$. However, this embodiment of this application is not limited thereto. For example, the two groups of basis vectors corresponding to the two polarization vectors of the antenna panel may not be completely the same or may be completely different. In other words, basis vectors in each polarization direction are independently determined.

It needs to be further understood that, in the precoding matrix in this embodiment of this application, each group of basis vectors corresponding to different antenna panels is $B_1$ to $B_L$. However, this embodiment of this application is not limited thereto. For example, a plurality of groups of basis vectors corresponding to the different antenna panels may not be completely the same or may be completely different. In other words, basis vectors of each antenna panel are independently determined, or basis vectors of different panels are not independently determined and have an association relationship.

It needs to be understood that, in this embodiment of this application, a value range of $c_i^l$ ($i \neq 1$) may be $\{+1, -1, +j, -j\}$, and different $c_i^l$ ($i \neq 1$) may have different values.

Optionally, ($N_g-1$) values of $c_i^l$ ($i \neq 1$) may be independent of each other, or one of ($N_g-1$) values of $c_i^l$ ($i \neq 1$) may be related to at least two other values of $c_i^l$ ($i \neq 1$). For example, one of the ($N_g-1$) values of $c_i^l$ ($i \neq 1$) is a product of the at least two other values of $c_i^l$ ($i \neq 1$). This embodiment of this application is not limited thereto.

It needs to be understood that, in the precoding matrix, two panel phase factors corresponding to two polarization vectors of a same subvector are the same. For example, each panel phase factor corresponding to the two polarization vectors is $c_i^l$ ($i \neq 1$). In one embodiment, the panel phase factors corresponding to the two polarization vectors corresponding to the same subvector may be opposite numbers. For example, one of the panel phase factors is $c_i^l$ ($i \neq 1$), and the other one is $-c_i^l$ ($i \neq 1$). This embodiment of this application is not limited thereto.

As an example instead of a limitation, the first indication information may include one or more PMIs. For example, the first indication information includes two PMIs: a first PMI and a second PMI.

In one embodiment, the first PMI is used to indicate $B_m$, $c_i^l$ ($i \neq 1$), and $a_{m,x,i}^l$, and the second PMI is used to indicate $p_{m,x,i}^l$.

In one embodiment, $a_{m,x,i}^l$ includes a bandwidth component of a scheduling bandwidth of the terminal device and a sub-band component of the scheduling bandwidth. The first PMI is used to indicate $B_m$, $\varphi_n$, and the bandwidth component, and the second PMI is used to indicate $p_{m,1,i}^l$ and the sub-band component.

Optionally, in another embodiment, the network device may send configuration information to the terminal device, to indicate whether $a_{m,x,1}^l$ includes the two components. For example, the configuration information is 1 bit. When a value of the configuration information is 1, it indicates that $a_{m,x,1}^l$ includes the two components; or when a value of the configuration information is 0, it indicates that $a_{m,x,1}^l$ includes the bandwidth component, and does not include the sub-band component. Alternatively, when a value of the configuration information is 0, it indicates that $a_{m,x,1}^l$ includes the two components; or when a value of the configuration information is 1, it indicates that $a_{m,x,i}^l$ includes the bandwidth component, and does not include the sub-band component.

Alternatively, in another embodiment, $c_i^l$ is equal to 0 or 1, and the first indication information is used to indicate $B_m$, $c_i^l$, $a_{m,x,i}^l$, and $p_{m,x,i}^l$.

In one embodiment, when l=1, it can be learned by substituting the foregoing form of $A_{m,x,i}^{l}$ into the foregoing formula of the precoding matrix that the form of the precoding matrix is:

$$W = \frac{1}{\alpha}\begin{bmatrix} \sum_{m=1}^{L} c_1^l a_{m,1,1}^l p_{m,1,1}^l B_m \\ \sum_{m=1}^{L} c_1^l a_{m,2,1}^l p_{m,2,1}^l B_m \\ \sum_{m=1}^{L} c_2^l a_{m,1,2}^l p_{m,1,2}^l B_m \\ \sum_{m=1}^{L} c_2^l a_{m,2,2}^l p_{m,2,2}^l B_m \\ \vdots \\ \sum_{m=1}^{L} c_{N_g}^l a_{m,1,N_g}^l p_{m,1,N_g}^l B_m \\ \sum_{m=1}^{L} c_{N_g}^l a_{m,2,N_g}^l p_{m,2,N_g}^l B_m \end{bmatrix},$$

where $$\frac{1}{\alpha}$$

is a normalized coefficient. For example, $$\frac{1}{\alpha} = \frac{1}{\sqrt{N_1 N_2 \sum_{i=1}^{N_g} \sum_{m=1}^{L} \sum_{r=1}^{2} (a_{m,r,i})^2}}.$$

It needs to be understood that, in the precoding matrix, two groups of basis vectors corresponding to two polarization vectors in a subvector corresponding to each antenna panel are the same, that is, each group of basis vectors is $B_1$ to $B_L$. However, this embodiment of this application is not limited thereto. For example, the two groups of basis vectors corresponding to the two polarization vectors of the antenna panel may not be completely the same or may be completely different. In other words, basis vectors in each polarization direction are independently determined.

It needs to be further understood that, in the precoding matrix in this embodiment of this application, each group of basis vectors corresponding to different antenna panels is $B_1$ to $B_L$. However, this embodiment of this application is not limited thereto. For example, a plurality of groups of basis vectors corresponding to the different antenna panels may not be completely the same or may be completely different. In other words, basis vectors of each antenna panel are independently determined, or basis vectors of different panels are not independently determined and have an association relationship.

Only a case in which $c_i^l$ is equal to 0 or 1 is described above. Optionally, a value of $c_i^l$ may alternatively be −1, +j, or −j. This embodiment of this application is not limited thereto.

Optionally, the first indication information may include one or more PMIs. For example, the first indication information includes two PMIs: a first PMI and a second PMI.

In one embodiment, the first PMI is used to indicate $B_m$, $c_i^l$, and $a_{m,x,i}^l$, and the second PMI is used to indicate $p_{m,x,i}^l$.

In one embodiment, $a_{m,x,i}^l$ includes a bandwidth component of a scheduling bandwidth of the terminal device and a sub-band component of the scheduling bandwidth. The first PMI is used to indicate $B_m$, $c_i^l$, and the bandwidth component, and the second PMI is used to indicate $p_{m,x,i}^l$ and the sub-band component.

Optionally, in another embodiment, the network device may send configuration information to the terminal device, to indicate whether $a_{m,x,i}^l$ includes the two components. For example, the configuration information is 1 bit. When a value of the configuration information is 1, it indicates that $a_{m,x,1}^l$ includes the two components; or when a value of the configuration information is 0, it indicates that $a_{m,x,1}^l$ includes the bandwidth component, and does not include the sub-band component. Alternatively, when a value of the configuration information is 0, it indicates that $a_{m,x,1}^l$ includes the two components; or when a value of the configuration information is 1, it indicates that $a_{m,x,1}^l$ the bandwidth component, and does not include the sub-band component.

It needs to be understood that, the foregoing embodiment shows the form of $$W = \frac{1}{\alpha}\begin{bmatrix} \sum_{m=1}^{L} c_1^l a_{m,1,1}^l p_{m,1,1}^l B_m \\ \sum_{m=1}^{L} c_1^l a_{m,2,1}^l p_{m,2,1}^l B_m \\ \sum_{m=1}^{L} c_2^l a_{m,1,2}^l p_{m,1,2}^l B_m \\ \sum_{m=1}^{L} c_2^l a_{m,2,2}^l p_{m,2,2}^l B_m \\ \vdots \\ \sum_{m=1}^{L} c_{N_g}^l a_{m,1,N_g}^l p_{m,1,N_g}^l B_m \\ \sum_{m=1}^{L} c_{N_g}^l a_{m,2,N_g}^l p_{m,2,N_g}^l B_m \end{bmatrix},$$

and in the precoding matrix W, basis vectors in polarization vectors in a same polarization direction of two different subvectors have respective phase coefficients and amplitude coefficients. For example, a basis vector in a first polarization vector of a first subvector has an amplitude coefficient $a_{m,1,1}^l$, a basis vector in a first polarization vector of a second subvector has an amplitude coefficient $a_{m,1,2}^l$, the basis vector in the first polarization vector of the first subvector has a phase coefficient $p_{m,1,1}^l$ and the basis vector in the first polarization vector of the second subvector has a phase coefficient $p_{m,1,1}^l$.

Alternatively, in this embodiment of this application, basis vectors in a same polarization vector of different subvectors may have a same phase coefficient and a same amplitude coefficient. For example, $a_{m,x,i}^l = a_{m,x,1}^l$, and $p_{m,x,i}^l = p_{m,x,1}^l$. Correspondingly, when l=1, the precoding matrix in this embodiment of this application may be transformed into the following form:

$$W = \frac{1}{\alpha} \begin{bmatrix} \sum_{m=1}^{L} c_1^l a_{m,1,1}^l p_{m,1,1}^l B_m \\ \sum_{m=1}^{L} c_1^l a_{m,2,1}^l p_{m,2,1}^l B_m \\ \sum_{m=1}^{L} c_2^l a_{m,1,1}^l p_{m,1,1}^l B_m \\ \sum_{m=1}^{L} c_2^l a_{m,2,1}^l p_{m,2,1}^l B_m \\ \vdots \\ \sum_{m=1}^{L} c_{N_g}^l a_{m,1,1}^l p_{m,1,1}^l B_m \\ \sum_{m=1}^{L} c_{N_g}^l a_{m,2,1}^l p_{m,2,2}^l B_m \end{bmatrix}.$$

In this case, the first indication information is used to indicate $B_m$, $c_i^l$, $a_{m,x,1}^l$, and $$p_{m,x,1}^l \cdot \frac{1}{\alpha}$$

is a normalized coefficient. For example, $$\frac{1}{\alpha} = \frac{1}{\sqrt{N_g N_1 N_2 \sum_{m=1}^{L} \sum_{r=1}^{2} (a_{m,r,1})^2}}.$$

Because the basis vectors corresponding to the same polarization vector of the different subvectors have the same amplitude coefficient and the same phase coefficient, in this embodiment of this application, a weight parameter of the precoding matrix may be simplified. In this embodiment of this application, the precoding matrix may be indicated by indicating the same phase coefficient and the same amplitude coefficient (namely, $p_{m,x,1}^l$ and $a_{m,x,1}^l$) of a weight of each basis vector in a group of subvectors and the antenna phase factor $c_i^l$ instead of indicating a weight of each basis vector in subvectors of all panels. Therefore, in this embodiment of this application, the size of indication information can be reduced, and system performance can be improved.

It needs to be understood that, in the precoding matrix, a plurality of groups of basis vectors ($B_1$ to $B_L$) in subvectors corresponding to different antenna panels are the same. However, this embodiment of this application is not limited thereto. For example, a plurality of groups of basis vectors ($B_1$ to $B_L$) in subvectors corresponding to different panels may not be completely the same or may be completely different. In other words, basis vectors of each antenna panel are independently determined, or basis vectors of the different panels are not independently determined and have an association relationship.

Optionally, the first indication information may include one or more PMIs. For example, the first indication information includes two PMIs: a first PMI and a second PMI.

In one embodiment, the first PMI is used to indicate $B_m$, $c_i^l$, and $a_{m,x,1}^l$ and the second PMI is used to indicate $p_{m,x,1}^l$.

In one embodiment, $a_{m,x,1}^l$ includes a bandwidth component of a scheduling bandwidth of the terminal device and a sub-band component of the scheduling bandwidth. The first PMI is used to indicate $B_m$, $c_i^l$, and the bandwidth component, and the second PMI is used to indicate $p_{m,x,1}^l$ and the sub-band component.

Optionally, in another embodiment, the network device may send configuration information to the terminal device, to indicate whether $a_{m,x,1}^l$ includes the two components. For example, the configuration information is 1 bit. When a value of the configuration information is 1, it indicates that $a_{m,x,1}^l$ includes the two components; or when a value of the configuration information is 0, it indicates that $a_{m,x,1}^l$ includes the bandwidth component, and does not include the sub-band component. Alternatively, when a value of the configuration information is 0, it indicates that $a_{m,x,1}^l$ includes the two components; or when a value of the configuration information is 1, it indicates that $a_{m,x,1}^l$ includes the bandwidth component, and does not include the sub-band component.

Optionally, as an example instead of a limitation, each precoding matrix in the foregoing embodiments of this application may be split into two-stage precoding matrices. For example, the precoding matrix in this embodiment of this application may be represented in the following form:

$$W = W_1 \times W_2, \text{ where}$$

$W_1$ is a stage-1 precoding matrix and may represent long-term wideband information, and $W_2$ is a stage-2 precoding matrix and may represent short-term narrowband information.

It needs to be understood that, in the precoding matrix in a plurality of embodiments of this application, two groups of basis vectors corresponding to two polarization vectors in a subvector corresponding to each antenna panel are the same, that is, each group of basis vectors is $B_1$ to $B_L$. However, this embodiment of this application is not limited thereto. For example, the two groups of basis vectors corresponding to the two polarization vectors of the antenna panel may not be completely the same or may be completely different. In other words, basis vectors in each polarization direction are independently determined.

It needs to be further understood that, in the precoding matrix in a plurality of embodiments of this application, each group of basis vectors corresponding to different antenna panels is $B_1$ to $B_L$. However, this embodiment of this application is not limited thereto. For example, a plurality of groups of basis vectors corresponding to the different antenna panels may not be completely the same or may be completely different. In other words, basis vectors of each antenna panel are independently determined, or basis vectors of different panels are not independently determined and have an association relationship.

520: The terminal device sends the first indication information. Correspondingly, the network device receives the first indication information.

For example, the terminal device sends the first indication information to the network device on a physical uplink shared channel (PUSCH) or a physical uplink control channel (PUCCH). The network device may configure the terminal device to feed back the first indication information on the PUSCH or on the physical uplink control channel (physical uplink control channel, PUCCH).

Optionally, the method may further include: sending, by the terminal device, a rank indication. In one embodiment, the terminal device may send the rank indication before sending the first indication information, or may simultaneously send the rank indication and the first indication information. There is no limitation on a sequence of sending the rank indication and sending the first indication information.

530: The network device determines the precoding matrix based on the first indication information.

In one embodiment, the network device determines, based on the first indication information, the precoding matrix in a codebook corresponding to the rank indication.

The network device then sends data based on the precoding matrix. For example, the network device may send the data to the terminal device on a physical downlink shared channel (PDSCH). This embodiment of this application is not limited thereto.

It needs to be understood that, in this embodiment of this application, when sending the data based on the precoding matrix, the network device may directly precode a to-be-transmitted signal by using the precoding matrix, or may perform another processing (for example, reconstruction) on the precoding vector and precode the to-be-transmitted signal by using the processed precoding vector.

Therefore, in this embodiment of this application, at least one subvector is set in the precoding matrix, so that the precoding matrix includes a subvector corresponding to an antenna port on each antenna panel of the network device. In addition, in this embodiment of this application, a signal that is sent by the network device through at least one panel can be precoded in a relatively accurate manner by using the precoding matrix. Therefore, accuracy of the codebook can be improved in this embodiment of this application.

It needs to be understood that the foregoing examples in FIG. 1 to FIG. 5 are merely intended to help a person skilled in the art understand the embodiments of this application, but are not intended to limit the embodiments of this application to a particular value or a particular scenario in the examples. A person skilled in the art apparently can make various equivalent modifications or changes according to the examples shown in FIG. 1 to FIG. 5, and such modifications or changes also fall within the scope of the embodiments of this application.

It needs to be understood that sequence numbers of the foregoing processes do not mean execution sequences in various embodiments of this application. The execution sequences of the processes need to be determined according to functions and internal logic of the processes, and do not need to be construed as any limitation on the implementation processes of the embodiments of this application.

With reference to FIG. 1 to FIG. 5, the foregoing describes in detail the data transmission method according to the embodiments of this application. With reference to FIG. 6 to FIG. 9, the following describes in detail an apparatus according to the embodiments of this application.

Figure 6:
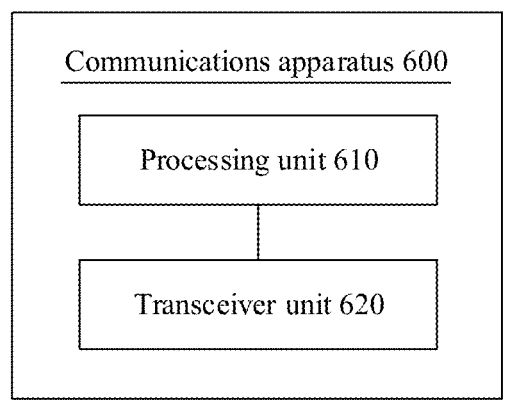
FIG. 6 is a schematic diagram of a communications apparatus according to an embodiment of this application.

FIG. 6 is a schematic structural diagram of a communications apparatus according to an embodiment of this application. The communications apparatus 600 may include:

a processing unit 610 and a transceiver unit 620.

In one embodiment, the processing unit is configured to generate first indication information, where the first indication information is used to indicate a precoding matrix, the precoding matrix is applied to at least one antenna panel and includes at least one precoding vector, each precoding vector includes at least one subvector, each subvector corresponds to an antenna port on the antenna panel and includes two polarization vectors, and each polarization vector is generated by performing weighted combination on a plurality of basis vectors.

The transceiver unit is configured to send the first indication information.

Optionally, the precoding matrix is:

$$\frac{1}{\alpha}[P_1 \quad P_2 \quad \ldots \quad P_r],$$

where $P_l$ is the precoding vector, $r \geq l \geq 1$, $r \geq 1$, r represents a quantity of data layers, $$\frac{1}{\alpha}$$

is a normalized coefficient, and $$0 < \frac{1}{\alpha} \leq 1;$$

the precoding vector $P_l$ is:

$$\begin{bmatrix} S_1^l \\ S_2^l \\ \vdots \\ S_{N_g}^l \end{bmatrix},$$

where $S_i^l$ is a subvector of the precoding vector $P_l$, $N_g \geq i \geq 1$, $N_g \geq 1$, and $N_g$ is a quantity of the at least one antenna panel; and the subvector $S_i^l$ is:

$$\begin{bmatrix} Q_{1,i}^l \\ Q_{2,i}^l \end{bmatrix},$$

where $Q_{x,i}^l$ is a polarization vector of the subvector $S_i^l$, and x is equal to 1 or 2.

Optionally, $$Q_{x,i}^l = \sum_{m=1}^{L} A_{m,x,i}^l B_m,$$

where $B_m$ is the basis vector, $L \geq m \geq 1$, $L \geq 2$, and $A_{m,x,i}^l$ is a weight of the basis vector $B_m$.

Optionally, $B_m$ is a Kronecker product of two vectors, a dimension of one vector is $N_1$, a dimension of the other vector is $N_2$, a dimension of $B_m$ is $N_1 N_2$, and each antenna panel has $N_1$ antenna port pairs in a first dimension and $N_2$ antenna port pairs in a second dimension.

Optionally, $A_{m,x,i}^l = a_{m,x,i}^l p_{m,x,i}^l$, where $a_{m,x,i}^l$ represents an amplitude coefficient, and $p_{m,x,i}^l$ represents a phase coefficient.

Optionally, $A_{m,2,i}^l = \varphi_m A_{m,1,i}^l$, where $\varphi_m$ represents a polarization phase factor, and the first indication information is used to indicate $B_m$, $\varphi_m$, $a_{m,1,i}^l$, and $p_{m,1,i}^l$.

Optionally, $A_{m,x,i}^l = c_i^l a_{m,x,i}^l p_{m,x,i}^l$, where $a_{m,x,i}^l$ represents an amplitude coefficient, $p_{m,x,i}^l$ represents a phase coefficient, and $c_i^l$ represents an antenna panel phase factor.

Optionally, $c_1^l = 1$, and the first indication information is used to indicate $B_m$, $c_i^l$ ($i \neq 1$), $a_{m,x,i}^l$, and $p_{m,x,i}^l$.

Optionally, $c_i^l$ is equal to 0 or 1, and the first indication information is used to indicate $B_m$, $c_i^l$, $a_{m,x,i}^l$, and $p_{m,x,i}^l$.

The communications apparatus 600 provided in this application corresponds to a process performed by the terminal device in the method embodiment in FIG. 5. For a function of each unit/module in the communications apparatus, refer to the foregoing descriptions. Details are not described herein again.

Therefore, in this embodiment of this application, at least one subvector is set in the precoding matrix, so that the precoding matrix includes a subvector corresponding to an antenna port on each antenna panel of a network device. In addition, in this embodiment of this application, a signal that is sent by the network device through at least one panel can be precoded in a relatively accurate manner by using the precoding matrix. Therefore, accuracy of a codebook can be improved in this embodiment of this application.

It needs to be understood that, the communications apparatus in FIG. 6 may be a terminal device, or may be a chip or an integrated circuit installed in a terminal device.

Figure 7:
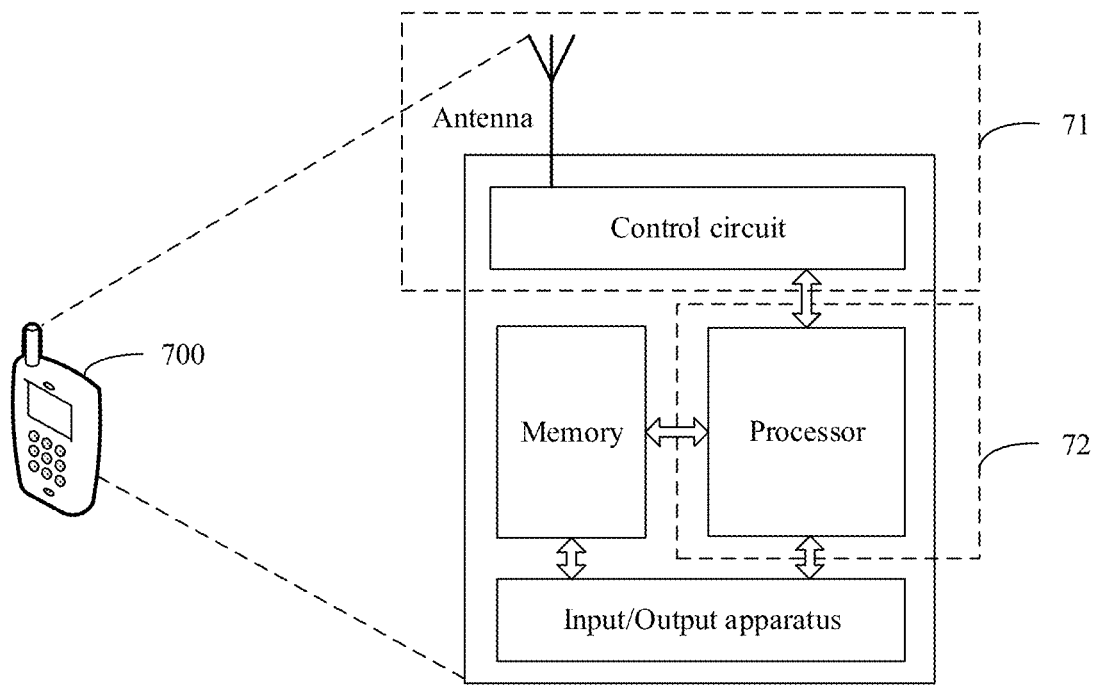
FIG. 7 is a schematic diagram of a communications apparatus according to another embodiment of this application.

For example, the communications apparatus is a terminal device. FIG. 7 is a schematic structural diagram of a terminal device according to an embodiment of this application. For ease of understanding and illustration, in FIG. 7, a mobile phone is used as an example of the terminal device. FIG. 7 shows only main components of the terminal device. As shown in FIG. 7, a terminal device 700 includes a processor, a memory, a control circuit, an antenna, and an input/output apparatus. The processor is mainly configured to: process a communications protocol and communications data, control the entire terminal device, execute a software program, and process data of the software program, for example, configured to support the terminal device in performing actions described in the foregoing method embodiments. The memory is mainly configured to store the software program and the data. The control circuit is mainly configured to perform conversion between a baseband signal and a radio frequency signal, and process the radio frequency signal. A combination of the control circuit and the antenna may also be referred to as a transceiver that is mainly configured to transmit and receive radio frequency signals in an electromagnetic wave form. The input/output apparatus such as a touchscreen, a display, or a keyboard is mainly configured to receive data entered by a user and output data to the user.

After the terminal device is powered on, the processor may read the software program in a storage unit, explain and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal through the antenna in the electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and only one processor. An actual terminal device may have a plurality of processors and a plurality of memories. The memory may also be referred to as a storage medium, a storage device, or the like. This is not limited in the embodiments of this application.

In one embodiment, the processor may include a baseband processor and a central processing unit. The baseband processor is mainly configured to process a communications protocol and communications data. The central processing unit is mainly configured to: control the entire terminal device, execute a software program, and process data of the software program. Functions of the baseband processor and the central processing unit may be integrated into the processor in FIG. 7. A person skilled in the art may understand that the baseband processor and the central processing unit each may be an independent processor, and are interconnected by using a technology such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communications data may be built in the processor, or may be stored in the storage unit in a form of the software program. The processor executes the software program to implement a baseband processing function.

In this embodiment of the present application, a control circuit and an antenna that has transmitting and receiving functions may be considered as a transceiver unit 71 of the terminal device 700, for example, configured to support the terminal device in performing the transmitting and receiving functions performed by the terminal device in the method embodiment shown in FIG. 4. A processor having a processing function is considered as a processing unit 72 of the terminal device 700, and corresponds to the processing unit 610 in FIG. 6. As shown in FIG. 7, the terminal device 700 includes the transceiver unit 71 and the processing unit 72. The transceiver unit may also be referred to as a transceiver, a transceiver apparatus, or the like. The transceiver unit corresponds to the transceiver unit 620 in FIG. 6. Optionally, a component configured to implement a receiving function in the transceiver unit 71 may be considered as a receiving unit, and a component configured to implement a sending function in the transceiver unit 71 may be considered as a sending unit. In other words, the transceiver unit 71 includes the receiving unit and the sending unit. The receiving unit may also be referred to as a receiver, an input port, a receiving circuit, or the like. The sending unit may be referred to as a transmitter, a transmitter circuit, or the like.

The processing unit 72 may be configured to execute an instruction stored in the memory, to control the transceiver unit 71 to receive a signal and/or transmit a signal, and implement functions of the terminal device in the foregoing method embodiments. In an implementation, it may be considered that functions of the transceiver unit 71 are implemented by using a transceiver circuit or a transceiver-dedicated chip.

It needs to be understood that, the terminal device 700 shown in FIG. 7 can implement each process of the terminal device in the method embodiment in FIG. 4. Operations and/or functions of modules in the terminal device 700 are intended to implement corresponding procedures in the foregoing method embodiments. For details, refer to the descriptions in the foregoing method embodiments. To avoid repetition, detailed descriptions are properly omitted herein.

Figure 8:
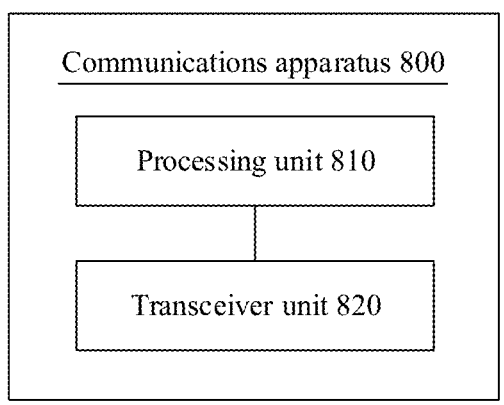
FIG. 8 is a schematic diagram of a communications apparatus according to another embodiment of this application.

FIG. 8 is a schematic structural diagram of a communications apparatus according to an embodiment of this application. The apparatus 800 may include:

a processing unit 810 and a transceiver unit 820.

In one embodiment, a processing unit and a transceiver unit are included.

The transceiver unit is configured to receive first indication information, where the first indication information is used to indicate a precoding matrix, the precoding matrix is applied to at least one antenna panel and includes at least one precoding vector, each precoding vector includes at least one subvector, each subvector corresponds to an antenna port on the antenna panel and includes two polarization vectors, and each polarization vector is generated by performing weighted combination on a plurality of basis vectors.

The processing unit is configured to determine the precoding matrix based on the first indication information.

Optionally, the precoding matrix is:

$$\frac{1}{\alpha}[P_1 \quad P_2 \quad \ldots \quad P_r],$$

where $P_l$ is the precoding vector, $r \geq l \geq 1$, $r \geq 1$, r represents a quantity of data layers, $$\frac{1}{\alpha}$$

is a normalized coefficient, and $$0 < \frac{1}{\alpha} \leq 1;$$

the precoding vector $P_l$ is:

$$\begin{bmatrix} S_1^l \\ S_2^l \\ \vdots \\ S_{N_g}^l \end{bmatrix},$$

where $S_i^l$ is a subvector of the precoding vector $P_l$, $N_g \geq i \geq 1$, $N_g \geq 1$, and $N_g$ is a quantity of the at least one antenna panel; and the subvector $S_i^l$ is:

$$\begin{bmatrix} Q_{1,i}^l \\ Q_{2,i}^l \end{bmatrix},$$

where $Q_{x,i}^l$ is a polarization vector of the subvector $S_i^l$, and x is equal to 1 or 2.

Optionally, $$Q_{x,i}^l = \sum_{m=1}^{L} A_{m,x,i}^l B_m,$$

where $B_m$ is the basis vector, $L \geq m > 1$, $L \geq 2$, and $A_{m,x,i}^l$ is a weight of the basis vector $B_m$.

Optionally, $B_m$ is a Kronecker product of two vectors, a dimension of one vector is $N_1$, a dimension of the other vector is $N_2$, a dimension of $B_m$ is $N_1 N_2$, and each antenna panel has $N_1$ antenna port pairs in a first dimension and $N_2$ antenna port pairs in a second dimension.

Optionally, $A_{m,x,i}^l = a_{m,x,i}^l p_{m,x,i}^l$, where $a_{m,x,i}^l$ represents an amplitude coefficient, and $p_{m,x,i}^l$ represents a phase coefficient.

Optionally, $A_{m,2,i}^l = \varphi_m A_{m,1,i}^l$, where $\varphi_m$ represents a polarization phase factor, and the first indication information is used to indicate $B_m$, $\varphi_m$, $a_{m,1,i}^l$, and $p_{m,1,i}^l$.

Optionally, $A_{m,x,i}^l = c_i^l a_{m,x,i}^l p_{m,x,i}^l$, where $a_{m,x,i}^l$ represents an amplitude coefficient, $p_{m,x,i}^l$ represents a phase coefficient, and $c_i^l$ represents an antenna panel phase factor.

Optionally, $c_i^l = 1$, and the first indication information is used to indicate $B_m$, $c_i^l$ ($i \neq 1$), $a_{m,x,i}^l$, and $p_{m,x,i}^l$.

Optionally, $c_i^l$ is equal to 0 or 1, and the first indication information is used to indicate $B_m$, $c_i^l$, $a_{m,x,i}^l$ and $p_{m,x,i}^l$.

The communications apparatus provided in this application corresponds to a process performed by the network device in the method embodiment in FIG. 4. For a function of each unit/module in the communications apparatus, refer to the foregoing descriptions. Details are not described herein again.

Therefore, in this embodiment of this application, at least one subvector is set in the precoding matrix, so that the precoding matrix includes a subvector corresponding to an antenna port on each antenna panel of a network device. In addition, in this embodiment of this application, a signal that is sent by the network device through at least one panel can be precoded in a relatively accurate manner by using the precoding matrix. Therefore, accuracy of a codebook can be improved in this embodiment of this application.

It needs to be understood that, the communications apparatus in FIG. 8 may be a network device, or may be a chip or an integrated circuit installed in a network device.

Figure 9:
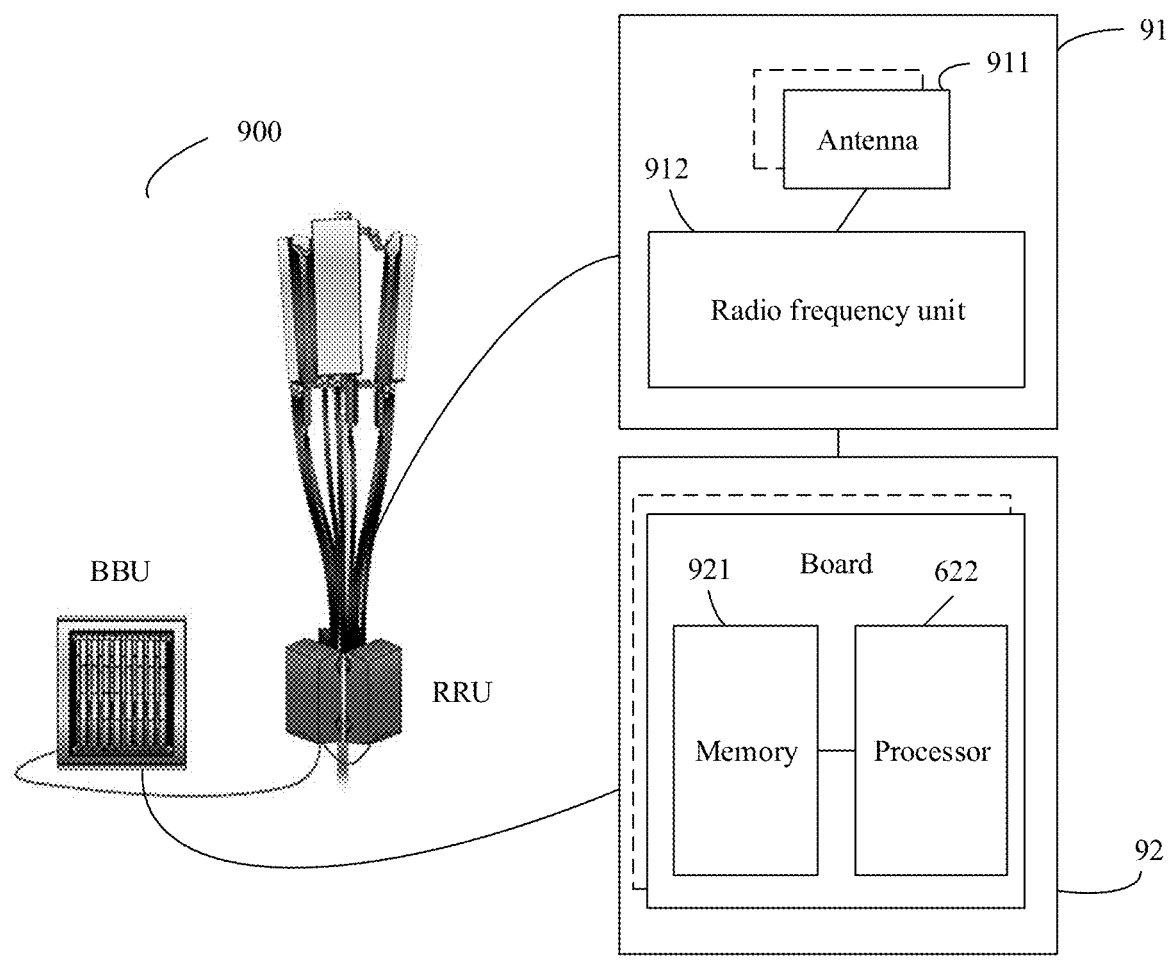
FIG. 9 is a schematic diagram of a communications apparatus according to another embodiment of this application.

For example, the communications apparatus is a network device. FIG. 9 is a schematic structural diagram of a network device according to an embodiment of this application, for example, may be a schematic structural diagram of a base station. As shown in FIG. 9, the network device 900 may be applied to the system shown in FIG. 1, and performs functions of the network device in the foregoing method embodiments.

The network device 900 may include one or more radio frequency units, for example, a remote radio unit (RRU) 91 and one or more baseband units (BBU) (which may also be referred to as a digital unit (DU)) 92. The RRU 91 may be referred to as a transceiver unit 91, and corresponds to the transceiver unit 720 in FIG. 7. Optionally, the transceiver unit may also be referred to as a transceiver, a transceiver circuit, or the like, and may include at least one antenna 911 and a radio frequency unit 912. The RRU 91 is mainly configured to: transmit and receive radio frequency signals and perform conversion between the radio frequency signal and a baseband signal, for example, configured to send information about a precoding matrix to a terminal device. The BBU 92 is mainly configured to: perform baseband processing, control the base station, and the like. The RRU 91 and the BBU 92 may be physically disposed together, or may be physically disposed separately, namely, a distributed base station.

The BBU 92 is a control center of the base station, or may be referred to as a processing unit 92. The BBU 92 may correspond to the processing unit 710 in FIG. 7, and is mainly configured to implement a baseband processing function, for example, channel coding, multiplexing, modulation, or spreading. For example, the BBU (processing unit) may be configured to control the base station to perform an operation procedure related to the network device in the foregoing method embodiments.

In an example, the BBU 92 may include one or more boards, and a plurality of boards may jointly support a radio access network (such as an LTE network) having a single access standard, or may separately support radio access networks (for example, an LTE network, a 5G network, or another network) having different access standards. The BBU 92 further includes a memory 921 and a processor 922. The memory 921 is configured to store an instruction and data. The processor 922 is configured to control the base station to perform actions, for example, configured to control the base station to perform an operation procedure related to the network device in the foregoing method embodiments. The memory 921 and the processor 922 may serve one or more boards. In other words, a memory and a processor may be independently disposed on each board. Alternatively, a plurality of boards may share a same memory and a same processor. In addition, a circuit may further be disposed on each board. It needs to be understood that, the network device 900 shown in FIG. 9 can implement each process of the network device in the method embodiment in FIG. 3. Operations and/or functions of modules in the network device 900 are intended to implement corresponding procedures in the foregoing method embodiments. For details, refer to the descriptions in the foregoing method embodiments. To avoid repetition, detailed descriptions are properly omitted herein.

An embodiment of this application further provides a processing apparatus, including a processor and an interface. The processor is configured to perform the communication method in any one of the foregoing method embodiments.

It needs to be understood that, the processing apparatus may be a chip. For example, the processing apparatus may be a field programmable gate array (FPGA), or may be an application-specific integrated chip (ASIC), or may be a system on chip (SoC), or may be a central processing unit (CPU), or may be a network processor (NP), or may be a digital signal circuit (DSP), or may be a micro controller unit (MCU), or may be a programmable logic device (PLD) or another integrated chip. In an implementation process, the operations in the foregoing methods may be implemented by using a hardware integrated logical circuit in the processor, or by using instructions in a form of software. The operations of the methods disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the operations in the foregoing methods in combination with hardware of the processor. To avoid repetition, details are not described herein again.

It needs to be noted that, the processor in the embodiments of this application may be an integrated circuit chip, and has a signal processing capability. In an implementation process, the operations in the foregoing method embodiments may be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the operations, and logical block diagrams that are disclosed in the embodiments of this application. The general purpose processor may be a microprocessor, or the processor may be any conventional processor or the like. The operations of the methods disclosed with reference to the embodiments of this application may be directly executed and completed by a hardware decoding processor, or may be executed and completed by using a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and implements the operations in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. As an example instead of a limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It needs to be noted that the memory of the systems and methods described in this specification includes but is not limited to these and any memory of another appropriate type.

An embodiment of this application further provides a communications system, including the foregoing network device and terminal device.

An embodiment of this application further provides a computer-readable medium. The computer-readable medium stores a computer program. When the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer instructions are loaded and executed on a computer, some or all of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

It needs to be understood that, although the foregoing describes a communication method during downlink transmission in a communications system, this application is not limited thereto. Optionally, a solution similar to that in the foregoing description may also be used during uplink transmission. To avoid repetition, details are not described herein again.

It needs to be understood that "an embodiment" mentioned throughout this specification means that particular features, structures, or characteristics related to the embodiments are included in at least one embodiment of this application. Therefore, "in an embodiment" or "in an embodiment" appearing throughout this specification unnecessarily refers to a same embodiment. In addition, these particular features, structures, or characteristics may be combined in one or more embodiments in any appropriate manner. It needs to be understood that sequence numbers of the foregoing processes do not mean execution sequences in various embodiments of this application. The execution sequences of the processes need to be determined according to functions and internal logic of the processes, and do not need to be construed as any limitation on the implementation processes of the embodiments of this application.

The terms such as "component", "module", and "system" used in this specification are used to indicate computer-related entities, hardware, firmware, combinations of hardware and software, software, or software being executed. For example, a component may be, but not limited to, a process that runs on a processor, a processor, an object, an executable file, a thread of execution, a program, and/or a computer. As shown in figures, both a computing device and an application that runs on the computing device may be components. One or more components may reside within the process and/or the thread of execution, and the components may be located on one computer and/or distributed between two or more computers. In addition, these components may be executed from various computer-readable media that store various data structures. The components may perform communication by using a local and/or remote process and based on, for example, a signal having one or more data packets (for example, data from two components interacting with another component in a local system, a distributed system, and/or across a network such as the Internet interacting with other systems by using the signal).

It needs to be further understood that, the first, second, third, fourth, and various numbers included in this specification are merely distinguished for convenient description, and are not intended to limit the scope of the embodiments of this application.

It needs to be understood that the term "and/or" in this specification describes only an association relationship for describing associated objects and represents that three relationships may exist. For example, A and/or B may represent the following three cases: Only A exists, both A and B exist, and only B exists.

A person of ordinary skill in the art may be aware that, in combination with illustrative logical blocks (illustrative logical block) and operations (operation) described in the embodiments disclosed in this specification, the embodiments of this application may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it does not need to be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it needs to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate components may or may not be physically separate. Components displayed as units may or may not be physical units, and in one embodiment, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used for implementation, all or some of the embodiments may be implemented in a form of a computer program product. The computer program product includes one or more computer instructions (programs). When the computer program instructions (programs) are loaded and executed on a computer, some or all of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

The foregoing descriptions are merely implementations of this application, but are not intended to limit the protection scope of this application. Any variation or replacement that can be readily figured out by a person skilled in the art within the technical scope disclosed in this application shall fall within the protection scope of this application. Therefore, the protection scope of this application shall be subject to the protection scope of the claims.

What is claimed is:

1. A communications apparatus comprising:
   a processor; and
   a transceiver,
   wherein, the processor is configured to generate first indication information, wherein the first indication information is used to indicate a precoding matrix, the precoding matrix is applied to at least one antenna panel and comprises at least one precoding vector, each precoding vector comprising at least one subvector, each subvector corresponds to an antenna port on the antenna panel and comprises two polarization vectors, and each polarization vector is generated by performing a weighted combination on a plurality of basis vectors, and
   the transceiver is configured to send the first indication information,
   wherein the two polarization vectors comprise a first polarization vector and a second polarization vector that respectively correspond to two polarization directions of a dual polarization antenna.

2. The communications apparatus according to claim 1, wherein
   the precoding matrix is:

$$\frac{1}{\alpha}[P_1 \quad P_2 \quad \ldots \quad P_r],$$

wherein
   $P_l$ is the precoding vector, r≥l≥1, r≥1, r represents a quantity of data layers, $$\frac{1}{\alpha}$$

is a normalized coefficient, and $$0 < \frac{1}{\alpha} \leq 1;$$

the precoding vector $P_l$ is:

$$\begin{bmatrix} S_1^l \\ S_2^l \\ \vdots \\ S_{N_g}^l \end{bmatrix},$$

wherein
   $S_i^l$ is a subvector of the precoding vector $P_l$, $N_g \geq i \geq 1$, $N_g \geq 1$, and $N_g$ is a quantity of the at least one antenna panel; and
   the subvector $S_i^l$ is:

$$\begin{bmatrix} Q_{1,i}^l \\ Q_{2,i}^l \end{bmatrix},$$

wherein
   $Q_{x,i}^l$ is a polarization vector of the subvector $S_i^l$, and x is equal to 1 or 2.

3. The communications apparatus according to claim 2, wherein $$Q_{x,i}^l = \sum_{m=1}^{L} A_{m,x,i}^l B_m,$$

wherein
   $B_m$ is the basis vector, L≥m>1, L≥2, and $A_{m,x,i}^l$ is a weight of the basis vector $B_m$.

4. The communications apparatus according to claim 3, wherein $B_m$ is a Kronecker product of two vectors, a dimension of one vector is $N_1$, a dimension of the other vector is $N_2$, a dimension of $B_m$ is $N_1 N_2$, and each antenna panel has $N_1$ antenna port pairs in a first dimension and $N_2$ antenna port pairs in a second dimension.

5. The communications apparatus according to claim 3, wherein $$A_{m,x,i}^l = a_{m,x,i}^l p_{m,x,i}^l, \text{ wherein}$$

$a_{m,x,i}^l$ represents an amplitude coefficient, and $p_{m,x,i}^l$ represents a phase coefficient.

6. The communications apparatus according to claim 5, wherein $$A_{m,2,i}^l = \varphi_m A_{m,1,i}^l, \text{ wherein}$$

$\varphi_m$ represents a polarization phase factor, and the first indication information is used to indicate $B_m$, $\varphi_m$, $a_{m,1,i}^l$, and $p_{m,1,i}^l$.

7. The communications apparatus according to claim 3, wherein $A_{m,x,i}^l = c_i^l a_{m,x,i}^l p_{m,x,i}^l$, wherein $a_{m,x,i}^l$ represents an amplitude coefficient, $p_{m,x,i}^l$ represents a phase coefficient, and $c_i^l$ represents an antenna panel phase factor.

8. The communications apparatus according to claim 7, wherein $c_i^l = 1$, and the first indication information is used to indicate $B_m$, $c_i^l (i \neq 1)$, $a_{m,x,i}^l$, and $p_{m,x,i}^l$.

9. The communications apparatus according to claim 7, wherein $c_i^l$ is equal to 0 or 1, and the first indication information is used to indicate $B_m$, $c_i^l$, $a_{m,x,i}^l$, and $p_{m,x,i}^l$.

10. A communications apparatus comprising:
   a processor; and
   a transceiver,
   wherein, the transceiver is configured to receive first indication information, wherein the first indication information is used to indicate a precoding matrix, the precoding matrix is applied to at least one antenna panel and comprises at least one precoding vector, each precoding vector comprising at least one subvector, each subvector corresponds to an antenna port on the antenna panel and comprises two polarization vectors, and each polarization vector is generated by performing a weighted combination on a plurality of basis vectors, and
   the processor is configured to determine the precoding matrix based on the first indication information,
   wherein the two polarization vectors comprise a first polarization vector and a second polarization vector that respectively correspond to two polarization directions of a dual polarization antenna.

11. The communications apparatus according to claim 10, wherein
the precoding matrix is:

$$\frac{1}{\alpha}[P_1 \quad P_2 \quad \ldots \quad P_r],$$

wherein
   $P_l$ is the precoding vector, $r \geq l \geq 1$, $r \geq 1$, r represents a quantity of data layers, $$\frac{1}{\alpha}$$

is a normalized coefficient, and $$0 < \frac{1}{\alpha} \leq 1;$$

the precoding vector $P_l$ is:

$$\begin{bmatrix} S_1^l \\ S_2^l \\ \vdots \\ S_{N_g}^l \end{bmatrix},$$

wherein
   $S_i^l$ is a subvector of the precoding vector $P_l$, $N_g \geq i \geq 1$, $N_g \geq 1$, and $N_g$ is a quantity of the at least one antenna panel; and the subvector $S_i^l$ is:

$$\begin{bmatrix} Q_{1,i}^l \\ Q_{2,i}^l \end{bmatrix},$$

wherein
   $Q_{x,i}^l$ is a polarization vector of the subvector $S_i^l$, and x is equal to 1 or 2.

12. The communications apparatus according to claim 11, wherein $$Q_{x,i}^l = \sum_{m=1}^{L} A_{m,x,i}^l B_m,$$

wherein
   $B_m$ is the basis vector, $L \geq m > 1$, $L \geq 2$, and $A_{m,x,i}^l$ is a weight of the basis vector $B_m$.

13. The communications apparatus according to claim 12, wherein $B_m$ is a Kronecker product of two vectors, a dimension of one vector is $N_1$, a dimension of the other vector is $N_2$, a dimension of $B_m$ is $N_1 N_2$, and each antenna panel has $N_1$ antenna port pairs in a first dimension and $N_2$ antenna port pairs in a second dimension.

14. The communications apparatus according to claim 12, wherein $A_{m,x,i}^l = a_{m,x,i}^l p_{m,x,i}^l$, wherein $a_{m,x,i}^l$ represents an amplitude coefficient, and $p_{m,x,i}^l$ represents a phase coefficient.

15. The communications apparatus according to claim 14, wherein $A_{m,2,i}^l = \varphi_m A_{m,1,i}^l$, wherein $\varphi_m$ represents a polarization phase factor, and the first indication information is used to indicate $B_m$, $\varphi_m$, $a_{m,1,i}^l$, and $p_{m,1,i}^l$.

16. The communications apparatus according to claim 12, wherein $A_{m,x,i}^l = c_i^l a_{m,x,i}^l p_{m,x,i}^l$, wherein $a_{m,x,i}^l$ represents an amplitude coefficient, $p_{m,x,i}^l$ represents a phase coefficient, and $c_i^l$ represents an antenna panel phase factor.

17. The communications apparatus according to claim 16, wherein $c_1^l = 1$, and the first indication information is used to indicate $B_m$, $c_i^l (i \neq 1)$, $a_{m,x,i}^l$, and $p_{m,x,i}^l$.

18. The communications apparatus according to claim 16, wherein $c_i^1$ is equal to 0 or 1, and the first indication information is used to indicate $B_m$, $c_i^l$, $a_{m,x,i}^l$, and $p_{m,x,i}^l$.

19. A non-transitory computer-readable storage medium, comprising a computer program, which when executed on a computer, causes the computer to perform a method comprising:
   generating, by a terminal device, first indication information, wherein the first indication information is used to indicate a precoding matrix, the precoding matrix is applied to at least one antenna panel and comprises at least one precoding vector, each precoding vector comprising at least one subvector, each subvector corresponds to an antenna port on the antenna panel and comprises two polarization vectors, and each polarization vector is generated by performing a weighted combination on a plurality of basis vectors; and sending the first indication information,
wherein the two polarization vectors comprise a first polarization vector and a second polarization vector that respectively correspond to two polarization directions of a dual polarization antenna.

20. The medium according to claim 19, wherein the precoding matrix is:

$$\frac{1}{\alpha}[P_1 \ P_2 \ \ldots \ P_r],$$

wherein
P$_l$ is the precoding vector, r≥l≥1, r≥1, r represents a quantity of data layers, $$\frac{1}{\alpha}$$

is a normalized coefficient, and $$0 < \frac{1}{\alpha} \leq 1;$$

the precoding vector P$_l$ is:

$$\begin{bmatrix} S_1^l \\ S_2^l \\ \vdots \\ S_{N_g}^l \end{bmatrix},$$

wherein
S$_i^l$ is a subvector of the precoding vector P$_l$, N$_g$≥i≥1, N$_g$≥1, and N$_g$ is a quantity of the at least one antenna panel; and
the subvector S$_i^l$ is:

$$\begin{bmatrix} Q_{1,i}^l \\ Q_{2,i}^l \end{bmatrix},$$

wherein
Q$_{x,i}^l$ is a polarization vector of the subvector S$_i^l$, and x is equal to 1 or 2.

* * * * *